(12) United States Patent
Oh et al.

(10) Patent No.: US 11,372,539 B2
(45) Date of Patent: Jun. 28, 2022

(54) METHOD AND APPARATUS FOR ADJUSTING A USER INTERFACE DISPLAYED ON A USER DEVICE USING A MASKING LAYER

(71) Applicant: KakaoBank Corp., Seongnam-si (KR)

(72) Inventors: Bo Hyun Oh, Seongnam-si (KR); Eun Jung Gil, Seongnam-si (KR); Su Ho Lee, Seongnam-si (KR); Ji Hong Park, Seongnam-si (KR); Oh Hyeon Kwon, Seongnam-si (KR); Hae Young Jung, Seongnam-si (KR)

(73) Assignee: KakaoBank Corp., Seongnam-si (KR)

( * ) Notice: Subject to any disclaimer, the term of this patent is extended or adjusted under 35 U.S.C. 154(b) by 0 days.

(21) Appl. No.: 17/225,663

(22) Filed: Apr. 8, 2021

(65) Prior Publication Data
US 2021/0318799 A1 Oct. 14, 2021

(30) Foreign Application Priority Data
Apr. 10, 2020 (KR) .......................... 10-2020-0043781
May 28, 2020 (KR) .......................... 10-2020-0064522

(51) Int. Cl.
*G06F 3/048* (2013.01)
*G06F 3/04883* (2022.01)
(Continued)

(52) U.S. Cl.
CPC ...... *G06F 3/04883* (2013.01); *G06F 3/04845* (2013.01); *G06F 21/84* (2013.01)

(58) Field of Classification Search
CPC ............ G06F 3/04883; G06F 3/04885; G06F 21/6245; G06F 21/84; G06F 2221/032;
(Continued)

(56) References Cited

U.S. PATENT DOCUMENTS 9,977,909 B1 * 5/2018 Austin ................ G06F 3/04883
10,474,345 B2 * 11/2019 Shey ..................... G06F 3/0488
(Continued)

FOREIGN PATENT DOCUMENTS

KR  10-2015-0090840 A  8/2015
KR  10-2016-0073679 A  6/2016

OTHER PUBLICATIONS

Nishino et al., A Tangible Information Explorer Using Vibratory Touch Screen, 2012, IEEE, 7 pages.*
(Continued)

*Primary Examiner* — Linh K Pham
(74) *Attorney, Agent, or Firm* — Knobbe Martens Olson & Bear LLP

(57) ABSTRACT

This application relates to a method for adjusting a user interface displayed on a user device using a masking layer, for example, so as to hide or block account information. In one aspect, the method includes displaying one or more accounts included in account information received from a financial institution server on a screen of the user device. The method may also include displaying a masking layer to cover a balance display area of the accounts displayed on the screen. The method may further include, if a touch event dragged in one direction occurs on the balance display area, adjusting a size of the masking layer using a length between a touch start point and a touch end point of the touch event. The method may further include, when the touch event ends, readjusting the size of the masking layer to cover the balance display area.

12 Claims, 22 Drawing Sheets

(51) Int. Cl.
*G06F 3/04845* (2022.01)
*G06F 21/84* (2013.01)

(58) Field of Classification Search
CPC ..... H04L 67/10; H04L 63/0227; H04L 63/20; H04L 63/083; H04L 63/102; G06Q 40/025; G06Q 10/025; G06Q 20/108; G06Q 40/123; G06Q 20/3829; G06Q 20/4012; G06Q 20/405
See application file for complete search history.

(56) References Cited

U.S. PATENT DOCUMENTS

| | | | | |
|---|---|---|---|---|
| 2010/0259560 | A1* | 10/2010 | Jakobson | G06F 21/62 345/629 |
| 2014/0282159 | A1* | 9/2014 | Lee | G06F 3/0481 715/768 |
| 2014/0372923 | A1* | 12/2014 | Rossi | G06F 3/0488 715/769 |
| 2015/0213274 | A1* | 7/2015 | Xu | G06F 3/04842 726/26 |
| 2015/0356304 | A1* | 12/2015 | You | G06F 3/04842 726/26 |
| 2016/0246979 | A1* | 8/2016 | Rakshit | G06F 21/6218 |
| 2018/0181294 | A1* | 6/2018 | Dare | G06F 3/04883 |

OTHER PUBLICATIONS

Kwon et al., Touch Pointer: Rethink Point-and-Click for Accurate Indirect Touch Interactions on Small Touchscreens, 2014, IEEE, 9 pages.*

Office Action dated Mar. 16, 2021 in Korean Application No. 10-2020-0064522, in 6 pages.

* cited by examiner

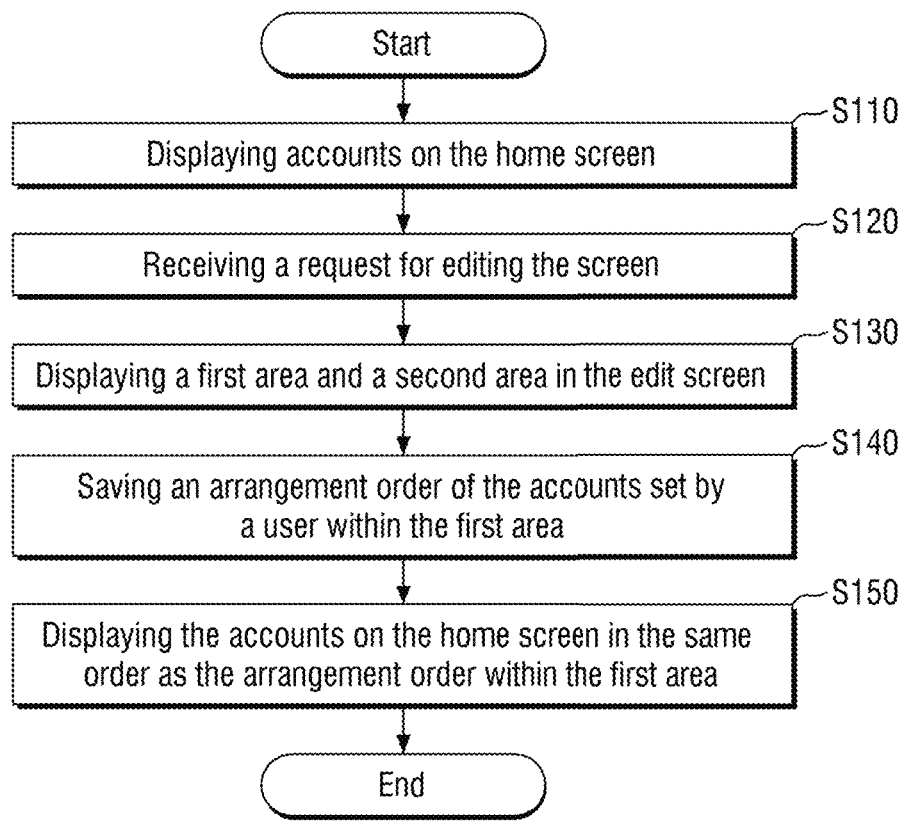

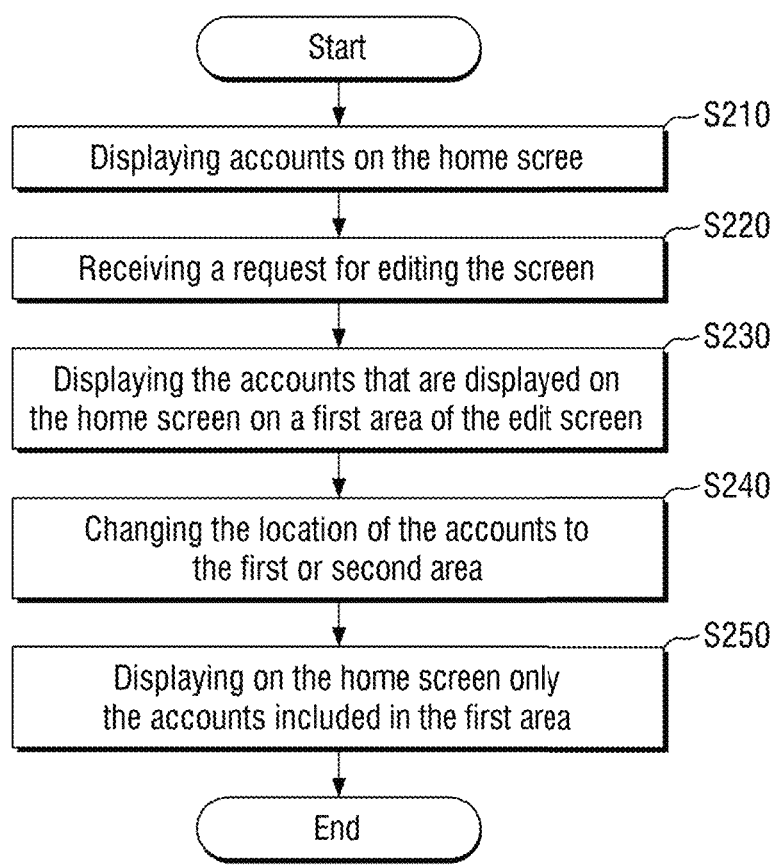

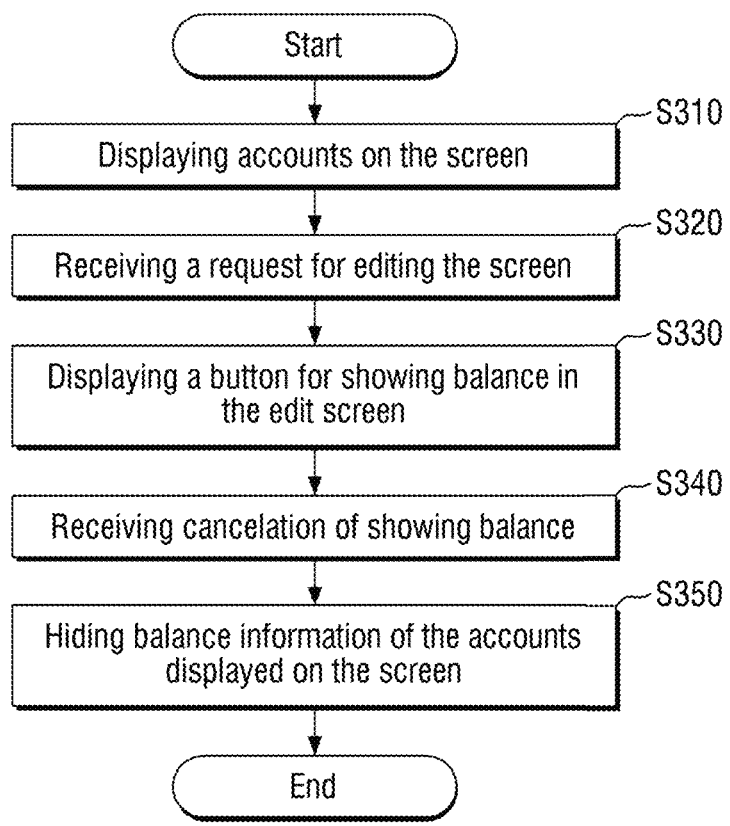

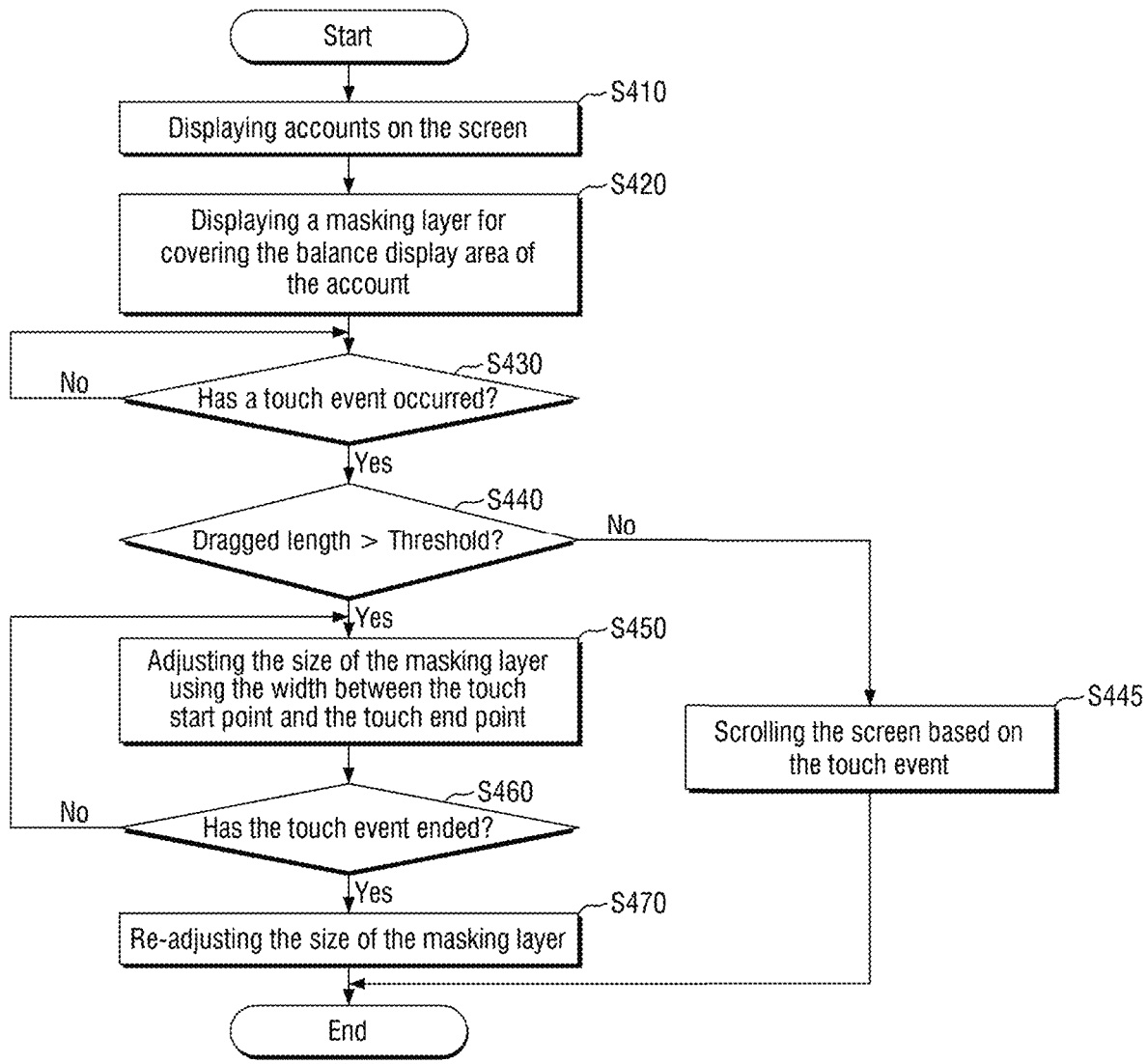

METHOD AND APPARATUS FOR ADJUSTING A USER INTERFACE DISPLAYED ON A USER DEVICE USING A MASKING LAYER

CROSS-REFERENCE TO RELATED APPLICATION

This application claims priority from Korean Patent Application No. 10-2020-0043781 filed on Apr. 10, 2020 and Korean Patent Application No. 10-2020-0064522 filed on May 28, 2020 in the Korean Intellectual Property Office, and all the benefits accruing therefrom under 35 U.S.C. 119, the contents of which in their entirety are herein incorporated by reference.

BACKGROUND

Field

The described technology relates to a method for adjusting a user interface displayed on a user device using a masking layer.

Description of the Related Technology

What is set forth in this section just provides background information on the present embodiments and does not constitute the prior art.

Currently, each financial institution provides various banking services using web pages and applications of banks as part of customer service. Such banking services using the Internet can reduce the loss of time for customers and improve the convenience of use compared with the conventional method of visiting a bank and conducting business in person.

SUMMARY

One aspect is a method for adjusting a user interface displayed on a user device using a masking layer, for example, so as to hide or block particular accounts or the balance information of the accounts of a user on a screen according to user settings and of disclosing hidden information through a touch event.

Another aspect is a method for adjusting a user interface displayed on a user device using a masking layer, for example, so as to hide or block account information, configured to hide the balance information of accounts displayed on a screen by displaying a masking layer in a balance display area in the accounts if a function of hiding the balance information is set.

Another aspect is a method for adjusting a user interface displayed on a user device using a masking layer, for example, so as to hide or block account information, configured to show part or all of the balance information using a touch start point and a touch end point of a touch event if the touch event occurs in an account whose balance information has been hidden.

Another aspect is a method for adjusting a user interface displayed on a user device using a masking layer, for example, so as to hide or block account information, configured to provide an interface for displaying the rest of the accounts other than set accounts on a home screen in a set arrangement order if a user sets particular accounts s/he intends to hide from the home screen by using an edit screen.

The described technology is not limited to those mentioned above, and other objects and advantages of the described technology that have not been mentioned can be understood by the following description, and will be more clearly understood by embodiments of the described technology. In addition, it will be readily understood that the objects and advantages of the described technology can be realized by the means and combinations thereof set forth in the claims.

Another aspect is a method for providing a service of hiding account information, performed in a user device linked with a financial institution server, including displaying one or more accounts included in account information received from the financial institution server on a screen of the user device, displaying a masking layer to cover a balance display area of the accounts displayed on the screen, if a touch event dragged in one direction occurs on the balance display area, adjusting a size of the masking layer using a length between a touch start point and a touch end point of the touch event, and when the touch event ends, readjusting the size of the masking layer to cover the balance display area.

Another aspect is a method for providing a service of hiding account information, performed in a user device linked with a financial institution server, including displaying a plurality of accounts included in account information received from the financial institution server on a home screen of the user device, receiving a screen edit request of a user through selection of an icon displayed on the home screen, and displaying the plurality of accounts in a first area of an edit screen, moving locations of some of the plurality of accounts from the first area to a second area different from the first area based on a user input, and displaying on the home screen only accounts included in the first area of the edit screen.

The method for providing a service of hiding account information of the described technology can prevent leakage of sensitive personal information and improve security by displaying an opaque masking layer on the balance display area of an account to prevent the account information (e.g., the balance information of the account) of a user from being constantly exposed on the home screen.

Further, the method for providing a service of hiding account information of the described technology discloses the balance information by adjusting the size of the masking layer based on the touch event of a user that has occurred in the balance display area. Through this, the user can check the balance of particular accounts only at the moments s/he desires, thereby reducing anxiety about exposure of financial information. Moreover, the described technology includes an entertainment element such as secretly checking the balance as if scratching a lottery ticket, so that users can feel fun and increase the utilization rate of the service.

Another aspect is a method of adjusting a user interface displayed on a user device, the method comprising: establishing, by a communication interface of the user device, a communication link with a server; receiving, by the communication interface, account information associated with a user from the server, the account information comprising one or more accounts of the user, each of the one or more accounts comprising at least a balance and an account number; providing, by a processor of the user device, a user interface on a display screen of the user device, the user interface configured to provide information associated with the one or more accounts, the user interface comprising a balance display area configured to display the balance of a selected account of the one or more accounts; controlling the user interface, by the processor, to display on the display screen a masking layer configured to cover the balance display area; determining, by the processor, whether a touch event dragged in one direction occurs on the balance display area, the touch event comprising a touch start point where dragging starts and a touch end point where the dragging ends; in response to determining that the touch event occurs on the balance display area, controlling the user interface, by the processor, to adjust a size of the masking layer based on a length between the touch start point and the touch end point of the touch event; determining, by the processor, whether the touch event ends; and in response to determining that the touch event ends, controlling the user interface, by the processor, to readjust the size of the masking layer to cover the balance display area such that the balance of the selected account is invisible on the display screen.

In the above method, the user interface further comprises: a background layer corresponding to the selected account; and a balance layer displayed on the background layer, being variable in size based on the touch event, and including balance information of the selected account, wherein the masking layer is disposed on the background layer and variable in size to be in inverse proportion to a change in size of the balance layer.

The above method further comprises: setting a width of the balance layer to a minimum value and setting a width of the masking layer to a maximum value in response to determining that the touch event does not occur; increasing the width of the balance layer and decreasing the width of the masking layer in response to determining that the touch event occurs; and decreasing the width of the balance layer and increasing the width of the masking layer in response to determining that the touch event ends.

In the above method, the width of the balance layer is set to a value obtained by adding a width between the touch start point and the touch end point to the minimum value; and the width of the masking layer is set to a value obtained by subtracting the width between the touch start point and the touch end point from the maximum value. In the above method, controlling the user interface to display the masking layer comprises: arranging the masking layer to overlap with balance information corresponding to the selected account; and making the masking layer opaque to cover the balance information.

The above method further comprises: setting a width of the masking layer to a maximum value in response to determining that the touch event does not occur; decreasing the width of the masking layer in response to determining that the touch event occurs; and increasing the width of the masking layer up to the maximum value in response to determining that the touch event ends. In the above method, the width of the masking layer is set to a value obtained by subtracting the width between the touch start point and the touch end point from the maximum value.

The above method further comprises: in response to determining that the touch event ends, changing a width of the masking layer after a predetermined time has elapsed or changing at the same time as the touch event ends. In the above method, controlling the user interface to adjust the size of the masking layer comprises: determining whether a dragged length of the touch event exceeds a preset threshold; and performing an operation of scrolling the screen based on the touch event in response to determining that the dragged length of the touch event does not exceed the threshold.

In the above method, controlling the user interface to adjust the size of the masking layer comprises: deriving a first axis movement displacement and a second axis movement displacement intersecting the first axis movement displacement based on the touch event; adjusting the size of the masking layer based on the first axis movement displacement; and scrolling the screen using the second axis movement displacement. In the above method, the touch start point is located to the left of the touch end point. In the above method, controlling the user interface to adjust the size of the masking layer comprises gradually changing the size of the masking layer to provide an animation effect.

Another aspect is a method of adjusting a user interface displayed on a user device, the method comprising: establishing, by a communication interface of the user device, a communication link with a server; receiving, by the communication interface, account information associated with a user from the server, the account information comprising a plurality of accounts of the user; providing, by a processor of the user device, a user interface on a display of the user device, the user interface configured to provide information associated with the plurality of accounts on a home screen of the display and an edit screen of the display, the edit screen comprising a first area and a second area different from and not overlapping the first area on the edit screen; controlling the user interface, by the processor, to display the plurality of accounts on the home screen of the display; receiving, by the processor, a screen edit request from the user through selection of an icon displayed on the home screen; controlling the user interface, by the processor, to display the plurality of accounts in the first area of the edit screen; controlling the user interface, by the processor, to mov locations of at least one of the plurality of accounts from the first area to the second area based on the screen edit request; and controlling the user interface, by the processor, to display on the home screen only one or more accounts remaining in the first area of the edit screen such that the at least one of the plurality of accounts moved to the second area is invisible on the home screen.

In the above method, a size of each of the plurality of accounts displayed on the home screen is formed to be larger than a size of each of the plurality of accounts displayed on the edit screen. In the above method, the edit screen, each of the plurality of accounts comprises an order change icon, and wherein accounts for which the order change icon is selected are moved from the first area to the second area through a drag and drop animation based on the user input.

In the above method, controlling the user interface to display on the home screen only the one or more accounts remaining in the first area comprises: fixing and displaying a preset primary account out of the plurality of accounts at a top of the home screen; and displaying the one or more remaining accounts on the home screen in the same order as an arrangement order in the first area.

Another aspect is a non-transitory computer-readable recording medium storing computer-executable instructions, the computer-executable instructions configured to cause a computing device having at least one processor and at least one memory to perform a method of adjusting a user interface displayed on a user device, the method comprising: establishing, by a communication interface of the user device, a communication link with a server; receiving, by the communication interface, account information associated with a user from the server, the account information comprising one or more accounts of the user, each of the one or more accounts comprising at least a balance and an account number; providing, by a processor of the user device, a user interface on a display screen of the user device, the user interface configured to provide information associated with the one or more accounts, the user interface comprising a balance display area configured to display the balance of a selected account of the one or more accounts; controlling the user interface, by the processor, to display on the display screen a masking layer configured to cover the balance display area; determining, by the processor, whether a touch event dragged in one direction occurs on the balance display area, the touch event comprising a touch start point where dragging starts and a touch end point where the dragging ends; in response to determining that the touch event occurs on the balance display area, controlling the user interface, by the processor, to adjust a size of the masking layer based on a length between the touch start point and the touch end point of the touch event; determining, by the processor, whether the touch event ends; and in response to determining that the touch event ends, controlling the user interface, by the processor, to readjust the size of the masking layer to cover the balance display area such that the balance of the selected account is invisible on the display screen.

Moreover, the method for providing a service of hiding account information of the described technology can reduce the hassle of finding particular accounts in an account list every time a user uses an application, by displaying accounts in the order specified in advance by the user on the home screen of the application.

In addition to what has been described, specific effects of the described technology will be described together while describing specific details for carrying out the described technology.

BRIEF DESCRIPTION OF THE DRAWINGS

FIGS. 2, 3A and 3B are diagrams for illustrating a method of setting a display order of accounts in accordance with some embodiments of the described technology.

FIGS. 4, 5A and 5B are diagrams for illustrating a method of setting for hiding accounts in accordance with some embodiments of the described technology.

FIGS. 7, 8A and 8B are diagrams for illustrating a method of adjusting a user interface displayed on a user device using a masking layer, for example, so as to set for hiding balance information of an account in accordance with some embodiments of the described technology.

FIG. 9 is a flowchart for illustrating an algorithm of a method of adjusting a user interface displayed on a user device using a masking layer, for example, so as to hide and show balance information in accordance with one embodiment of the described technology.

DETAILED DESCRIPTION

Figure 1:
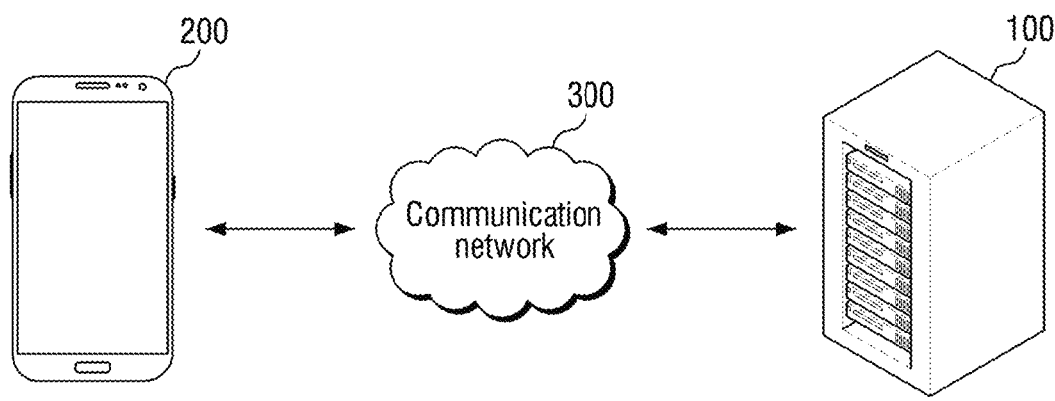
FIG. 1 is a diagram for illustrating a system for performing a method of adjusting a user interface displayed on a user device using a masking layer, for example, so as to hide account information in accordance with some embodiments of the described technology.

In general, when a user accesses a user account through a banking application, the home screen displays a plurality of accounts of the user in a fixed order. However, since existing applications do not allow the order of a plurality of accounts to be changed on the home screen, there was an inconvenience that a user had to search for, one by one at each use, particular accounts s/he would like to find regardless of the frequency of use.

In addition, since existing banking applications display all the accounts owned by a user and the information on each account (e.g., balance information, etc.) on the home screen, there was a risk of leakage of the account information and personal information of the user when using financial services through a banking application in public places.

Therefore, there was a need for a service that could hide information on particular accounts of a user or allow hidden information to be checked only when the user so desired while the user was using a banking application.

The terms or words used in the present description and the claims should not be construed as limited to their ordinary or lexical meanings. They should be construed as the meaning and concept in line with the technical idea of the described technology based on the principle that the inventor can define the concept of terms or words in order to describe his/her own inventive concept in the best possible way. Further, since the embodiment described herein and the configurations illustrated in the drawings are merely one embodiment in which the described technology is realized and do not represent all the technical ideas of the described technology, it should be understood that there may be various equivalents, variations, and applicable examples that can replace them at the time of filing this application.

Although terms such as first, second, A, B, etc. used in the present description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the described technology. The term 'and/or' includes a combination of a plurality of related listed items or any item of the plurality of related listed items.

The terms used in the present description and the claims are merely used to describe particular embodiments and are not intended to limit the described technology. Singular expressions include plural expressions unless the context explicitly indicates otherwise. In the present application, terms such as "comprise," "have," etc. should be understood as not precluding the possibility of existence or addition of features, numbers, steps, operations, components, parts, or combinations thereof described herein.

Unless otherwise defined, all terms used herein, including technical or scientific terms, have the same meaning as commonly understood by those of ordinary skill in the art to which the described technology pertains.

Terms such as those defined in commonly used dictionaries should be construed as having a meaning consistent with the meaning in the context of the relevant art, and are not to be construed in an ideal or excessively formal sense unless explicitly defined in the present application.

In addition, each configuration, procedure, process, method, or the like included in each embodiment of the described technology may be shared to the extent that they are not technically contradictory to each other.

Hereinafter, a method for providing a service of hiding account information, which is capable of hiding particular accounts of a user and the balance deposited in the accounts of the user from a screen according to user settings, will be discussed in detail.

FIG. 1 is a diagram for illustrating a system that can carry out a method for adjusting a user interface displayed on a user device using a masking layer, for example, so as to hide account information in accordance with some embodiments of the described technology.

The system of FIG. 1 may comprise a server 100 and a user device 200 communicating data with each other via a communication network 300. The server 100 may include a processor configured to perform server operations, a memory configured to store instructions to perform the server operations described below, and a communication interface configured to communicate data with the user device 200. The user device 200 may include a processor configured to perform user device operations described below, a memory configured to store instructions to perform the user device operations, a display, and a communication interface configured to communicate data with the server 100. The processor of the user device 200 may provide a user interface on the display to interact with a user and hide and show account information.

The server 100 may be linked with the user device 200 to act as an execution agent of the method for providing a service of hiding account information in accordance with an embodiment of the described technology. The server 100 can manage a plurality of accounts for a particular user, change the order of accounts and display them on the user device 200, and perform a function of hiding or disclosing particular accounts and the balance information for the particular accounts.

Specifically, the server 100 in accordance with an embodiment of the described technology provides the user device 200 with the information on a plurality of accounts of the user (hereinafter, account information). Here, the account information may include an account name, an account number, balance information, etc.

Next, the server 100 may display the plurality of accounts of the user on the screen of the user device 200. Each account may be displayed on the screen of the user device 200 so as to include information, such as an account name, an account number, balance information, etc.

At this time, the balance information of an account may be displayed on a preset balance display area of the account. Depending on display methods, the balance information may be displayed on a background layer or on a separate balance layer of the account.

In addition, the server 100 may display at the top of the user device 200 a preset primary account out of the plurality of accounts displayed on the user device 200.

If a particular account is suspended, the server 100 may display the account name, the account number, etc., excluding the balance information in that account. However, this is just one example and the described technology is not limited thereto.

Next, the server 100 may receive a setting for an account display method from a user through an edit screen provided to the user device 200. The user may set a display order of the accounts, whether or not the accounts are to be hidden, whether or not the balance information of the accounts is to be displayed (hereinafter, referred to as a balance display), etc., via the user device 200.

At this time, the edit screen may comprise a first area including accounts to be displayed on the home screen of an application running on the user device 200, a second area including accounts to be hidden from the home screen, and a button for selecting whether to show the balance (hereinafter, a balance display button).

For example, the user may move a plurality of accounts included in the first area to the second area through the edit screen. Further, by selecting and moving the accounts included in the first area, it is possible to change an arrangement order of the plurality of accounts included in the first area.

Upon completion of editing, the server 100 may receive the accounts included in the first area and the account included in the second area. Subsequently, the user device 200 may display only the accounts included in the first area on the screen based on the information received.

In addition, the user device 200 may display a plurality of accounts on the screen based on an arrangement order for the plurality of accounts included in the first area.

On the other hand, if the user has canceled the setting of the balance display button through the edit screen, the user device 200 may display a masking layer in the balance display area of the account. At this time, the masking layer may be displayed opaquely.

In one embodiment, if the balance information of an account is displayed on the balance display area through the balance layer, the user device 200 may set and display an initial value of the width of the balance layer to be the minimum value of a preset range. Further, the server 100 may set and display an initial value of the width of the masking layer to be the maximum value of a preset range. Next, the server 100 may adjust the widths of the balance layer and the masking layer so that the change in the sizes of the balance layer and the masking layer is in inverse proportion to each other based on a touch event of the user. This will be described in detail below.

Moreover, in another embodiment, if the balance information of an account is displayed in the balance display area, the server 100 may set and display the width of the masking layer so that the masking layer covers the balance information in the balance display area. As the masking layer overlaps with the balance information, the balance information of the account may be hidden.

Next, the user device 200 may disclose the hidden balance information of the account through a touch event (e.g., a touch event of dragging to the right) of the user. At this time, the user device 200 may receive a touch start point and a touch end point of the touch event of the user.

For example, the touch event may be a user input that is dragged from left to right, and in this case, the touch start point may be located to the left of the touch end point. However, the described technology is not limited to the touch event described above, and the touch event may be variously modified and implemented. In the following, the description will be given with an example that the touch event is a user input that is dragged from left to right for convenience of description.

Next, the user device 200 may adjust the size of the masking layer based on a calculated width between the touch start point and the touch end point of the touch event.

In one embodiment, the user device 200 may disclose the balance information included in the width of the balance layer by increasing the width of the balance layer and decreasing the width of the masking layer using the calculated width.

Further, in another embodiment, the user device 200 may disclose the balance information displayed in the balance display area by decreasing the width of the masking layer using the calculated width.

Next, when the touch event ends, the user device 200 may hide the balance information by readjusting the size of the masking layer to a preset initial value.

Meanwhile, an application (e.g., a banking application) used to communicate with the server 100 may be installed on the user device 200. The user may change the display order of accounts or hide particular accounts and the balance information of the accounts through the application (hereinafter, referred to as an application) installed on the user device 200.

In some embodiments of the described technology, the user device 200 may refer to various electronic devices such as a personal computer (PC), a laptop computer, a tablet, a mobile phone, a smartphone, a wearable device (e.g., a watch-type device), etc.

Further, the user device 200 may comprise an input unit configured to receive a user input, a display unit configured to display visual information, a communication unit configured to transmit and receive signals to and from the outside, and a control unit configured to process data, control the respective units inside the user device 200, and control data transmission/reception between the units. In the following, what the control unit performs inside the user device 200 according to the commands of the user is collectively referred to as being performed by the user device 200.

In addition, the server 100 is a computer system that provides information or services to the user device 200 through the communication network 300 and may refer to a computer program or device. Moreover, the server 100 described above may be directly operated or managed by a particular company or individual, or may be outsourced, or may be operated by the same entity.

Furthermore, since the name of the server 100 is not specified, functions performed by each server 100 may also be performed by other servers 100, and as a matter of course, functions performed by one server 100 may be performed separately by a plurality of servers 100.

On the other hand, the communication network 300 serves to connect the server 100 and the user device 200. That is, the communication network 300 refers to a communication network that provides a connection route so that the user device 200 can transmit and receive data after connecting to the server 100. The communication network 300 may encompass, for example, wired networks such as LANs (Local Area Networks), WANs (Wide Area Networks), MANs (Metropolitan Area Networks), ISDNs (Integrated Service Digital Networks), etc., and wireless networks such as wireless LANs, CDMA, Bluetooth, satellite communication, etc., but the scope of the described technology is not limited thereto.

The method for providing a service of hiding account information of the described technology may be performed only on the server 100, or divided into and performed by the server 100 and the user device 200. However, a description will be provided, with the execution agent being generally treated as the user device 200 for convenience of description in the following.

Figure 3A:
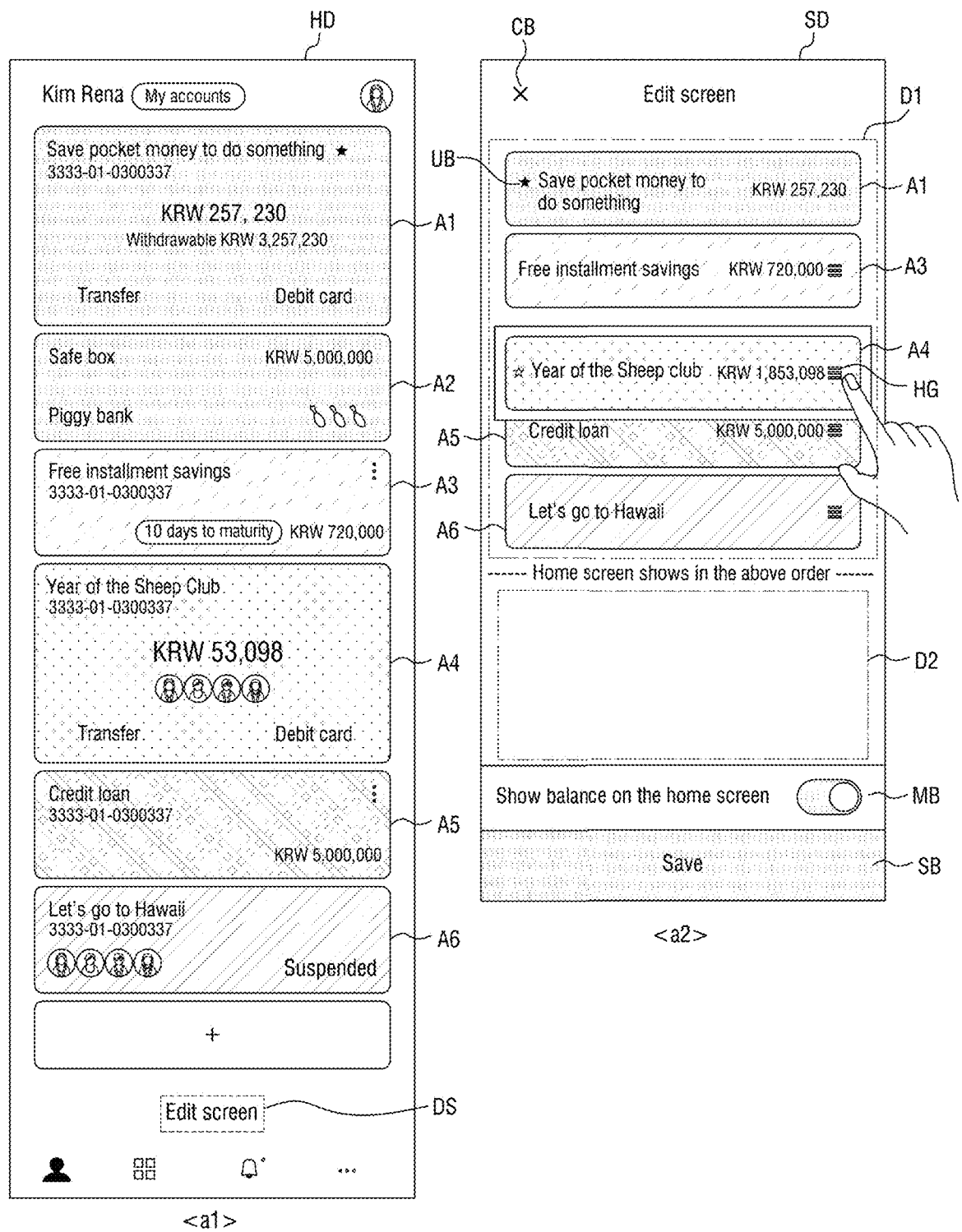
Figure 3B:
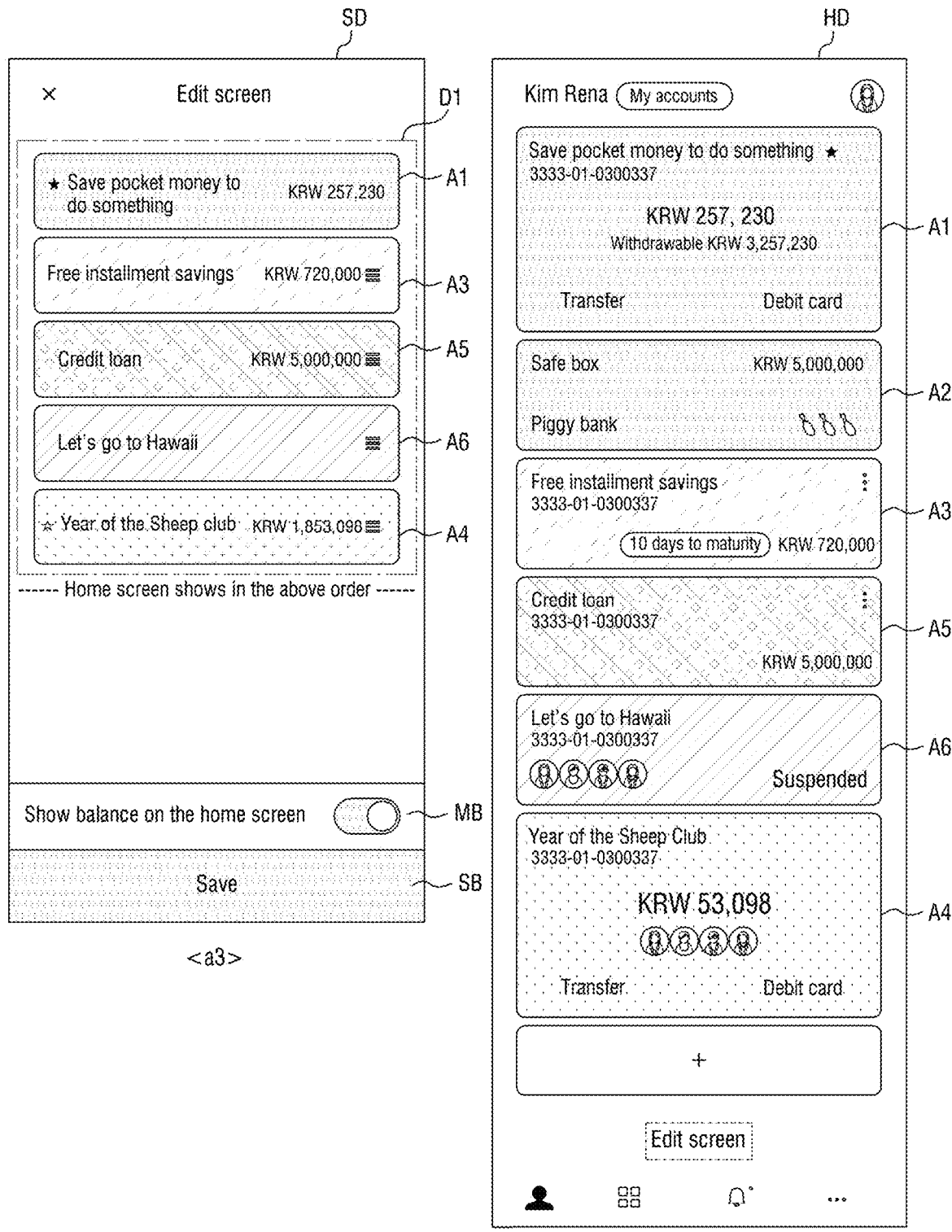

FIGS. 2, 3A and 3B are diagrams for illustrating a method of setting a display order of accounts in accordance with some embodiments of the described technology.

First, referring to FIG. 2, the user device 200 displays a plurality of accounts on the home screen of the application (S110). At this time, the user device 200 may include account names, account numbers, balance information of the accounts, etc., in the accounts displayed. The user device 200 may display each account (or account icon) in a preset color.

Next, the user device 200 receives a screen edit request from the user (S120).

At this time, the user device 200 may receive a selection for an icon (e.g., a screen edit button) displayed on the home screen from the user. After receiving the screen edit request, the user device 200 may display an edit screen on the screen.

Next, the user device 200 displays the first area and the second area in the edit screen (S130).

At the time of the initial setting of the edit screen, the user device 200 may display on the first area a plurality of accounts belonging to the user. In this case, the information on the plurality of accounts may be used by receiving it from the server 100. The user device 200 may display an order change icon on each of the plurality of accounts included in the first area. For the accounts for which the order change icon is selected, their arrangement order position may be changed based on the user input.

Next, the user device 200 saves an arrangement order of the plurality of accounts set by the user in the first area (S140). At this time, the user device 200 may fix a preset primary account at the top of the home screen. However, this is just one example and the described technology is not limited thereto.

Next, the user device 200 displays the plurality of accounts of the user on the home screen in the same order as the arrangement order in the first area (S150).

In the following, a method of setting an arrangement order of the accounts displayed on the home screen in accordance with some embodiments of the described technology will be described with reference to FIG. 3.

In FIGS. 3A and 3B, <a1> shows the home screen HD of the application, <a2> and <a3> show the edit screen SD of the home screen HD, and <a4> shows the home screen HD after editing has been completed.

Referring to FIG. 1 and <a1> of FIG. 3A, the user device 200 of the method for providing a service of hiding account information in accordance with an embodiment of the described technology may display a plurality of accounts for the user, a screen edit button DS or the like on the home screen HD of the application.

The user device 200 may display a first account A1, a second account A2, a third account A3, a fourth account A4, a fifth account A5, and a sixth account A6 on the home screen HD. The user device 200 may display the first account A1, the second account A2, the third account A3, the fourth account A4, the fifth account A5, and the sixth account A6 on the home screen HD in the same order as the accounts were created. However, the described technology is not limited thereto.

At this time, the first account A1 may be a preset primary account. If the user has set the first account A1 to be the primary account, the user device 200 may display a character icon (e.g., a star icon) in the first account A1. Next, the user device 200 may fix and display the first account A1 at the top of the home screen HD. However, this is just one example and the described technology is not limited thereto.

The user device 200 may display the account name, account number, balance, account type (e.g., installment savings, credit loans, etc.), etc. in the account.

Next, referring to <a2> of FIG. 3A and <a3> of FIG. 3B, if the user clicks the screen edit button DS of the home screen HD, the user device 200 may display the edit screen SD for the home screen HD in the application. The edit screen SD may comprise a first area D1 including accounts to be displayed on the home screen HD, a second area D2 including accounts to be hidden from the home screen HD, a balance display button MB, etc.

At this time, the user device 200 may display the accounts on the edit screen SD so as to be smaller than the size of the accounts displayed on the home screen HD. Through this, the user can grasp the order of the plurality of accounts at a glance on the edit screen SD.

In addition, the user device 200 may set an all-account show state (i.e., all-account display state) as the default. As a result, the user device 200 may initially display movable accounts among the plurality of accounts displayed on the home screen HD on the first area D1. Further, the user device 200 may set the initial second area D2 to be empty.

Details of the function of the second area D2 will be described later with reference to FIGS. 5 to 6.

The user device 200 may display the first account A1, the third account A3, the fourth account A4, the fifth account A5, and the sixth account A6 on the first area D1 in the same arrangement order as the accounts displayed on the home screen HD.

At this time, the user device 200 may not display the accounts to be excluded from editing on the first area D1 (e.g., continuation of opening an account, a contract card for monthly or deposit-based rent, a safe box, a piggy bank, etc.).

Accordingly, the user device 200 may display the first account A1, the third account A3, the fourth account A4, the fifth account A5, and the sixth account A6 on the edit screen SD, except for the second account A2 corresponding to the safe box in the first area D1.

The user device 200 may display account details the same as those displayed on the home screen HD (e.g., the account color, account name, and balance information), a primary account setting function UB, and an order change icon HG onto the plurality of accounts displayed on the edit screen SD.

The user device 200 may receive a display setting for the balance information (e.g., show or hide the balance; hereinafter, a balance display setting) of the accounts displayed on the home screen HD through the balance display button MB. At this time, the initial setting of the balance display button MB may be 'show balance.' The balance display setting may be applied to all of the accounts displayed on the home screen (HD), rather than the setting for each account. However, the described technology is not limited thereto, and the balance display setting may be possible for each account depending on embodiments.

In this case, the user device 200 in the edit screen SD may display the balance information of the respective accounts displayed on the edit screen SD, regardless of whether the balance display button MB is canceled.

For example, the balance information may include the balance of demand deposits, meeting bankbooks, and other various types of bankbooks, the balance of deposits and installment savings, and the balance of a loan in a credit.

If an account is in a suspended state or a meeting-member bankbook is in a suspended state, the user device 200 may exclude the suspended account and the balance information of the meeting-member bankbook account including the suspended account. However, this is just one example and the described technology is not limited thereto.

In addition, the user device 200 may display the primary account setting function UB on the accounts displayed on the edit screen SD. The user device 200 may display the primary account setting function UB on the demand deposit accounts, meeting-host bankbook accounts, and other various types of accounts. At this time, it may not be possible to designate a deposit/withdrawal suspension account, a transaction suspension account, and a dormant account as a primary account.

If the user sets the primary account setting function UB for a particular account, the user device 200 may display a star icon in the account. Further, the user device 200 may fix and display the particular account set as the primary account at the top of the home screen HD and the first area D1.

Next, the user may change the arrangement order of the plurality of accounts displayed in the first area D1 by using the order change icon HG displayed on the plurality of accounts in the edit screen SD.

For example, the user can move the fourth account A4 to below the sixth account A6 by touching or dragging and dropping the order change icon HG of the fourth account A4 displayed in the first area D1. As the user moves the fourth account A4, the user device 200 may display the plurality of accounts in the first area D1 in the order of the first account A1, the third account A3, the fifth account A5, the sixth account A6, and the fourth account A4.

At this time, if there are many accounts displayed on the edit screen SD, the user device 200 may provide a scroll operation to check the account list up and down.

If the user has started using edit functions, such as setting a primary account, changing the order of accounts, changing the setting of the balance display button, etc., the user device 200 may display a save button SB on the edit screen SD.

Next, if the user clicks the save button SB, the user device 200 may apply and display the changes made on the edit screen SD onto the home screen HD.

If the user clicks a cancel button CB, the user device 200 may cancel all the changes set in the edit screen SD and then display the home screen HD.

Next, referring to <a4> of FIG. 3B, the user device 200 may display the plurality of accounts on the home screen HD in the same arrangement order as the account arrangement order in the edit screen SD.

Specifically, the user device 200 may display the fourth account A4 below the sixth account A6 based on the account arrangement order set in the edit screen SD. At this time, the first account A1, serving as the primary account, may be located at the top of the home screen HD. The second account A2, which has been excluded from editing, may be displayed below the first account A1, which is the same as the previous location (the location shown in <a1> of FIG. 3).

The user device 200 may display the plurality of accounts on the home screen HD in the order of the first account A1, the second account A2, the third account A3, the fifth account A5, the sixth account A6, and the fourth account A4.

Through this, the method for providing a service of hiding account and balance information of the described technology can reduce the hassle of finding frequently used accounts from an account list every time the accounts are used by displaying the accounts in the order the user wants on the home screen.

In the following, a method of setting for hiding accounts in accordance with some embodiments of the described technology will be described.

Figure 5A:
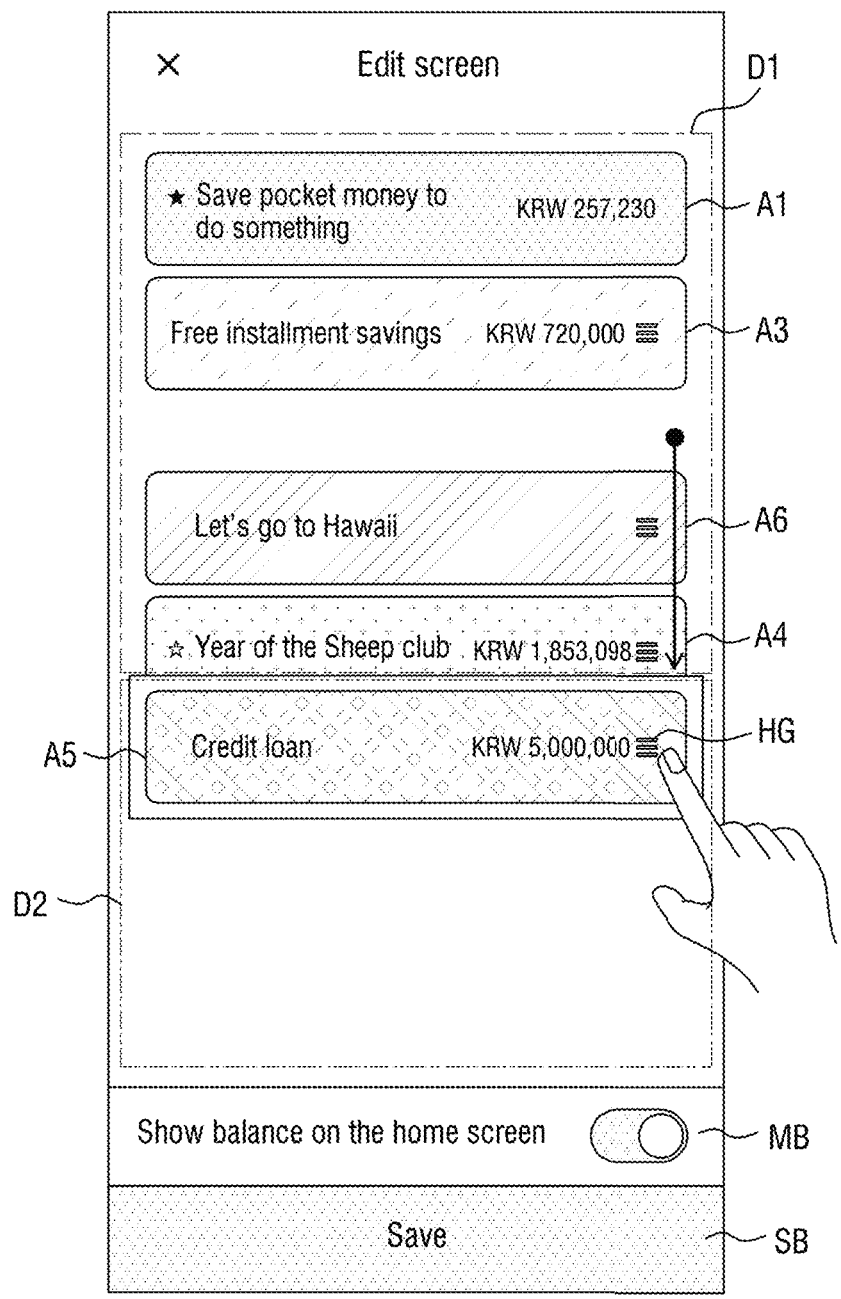
Figure 5B:
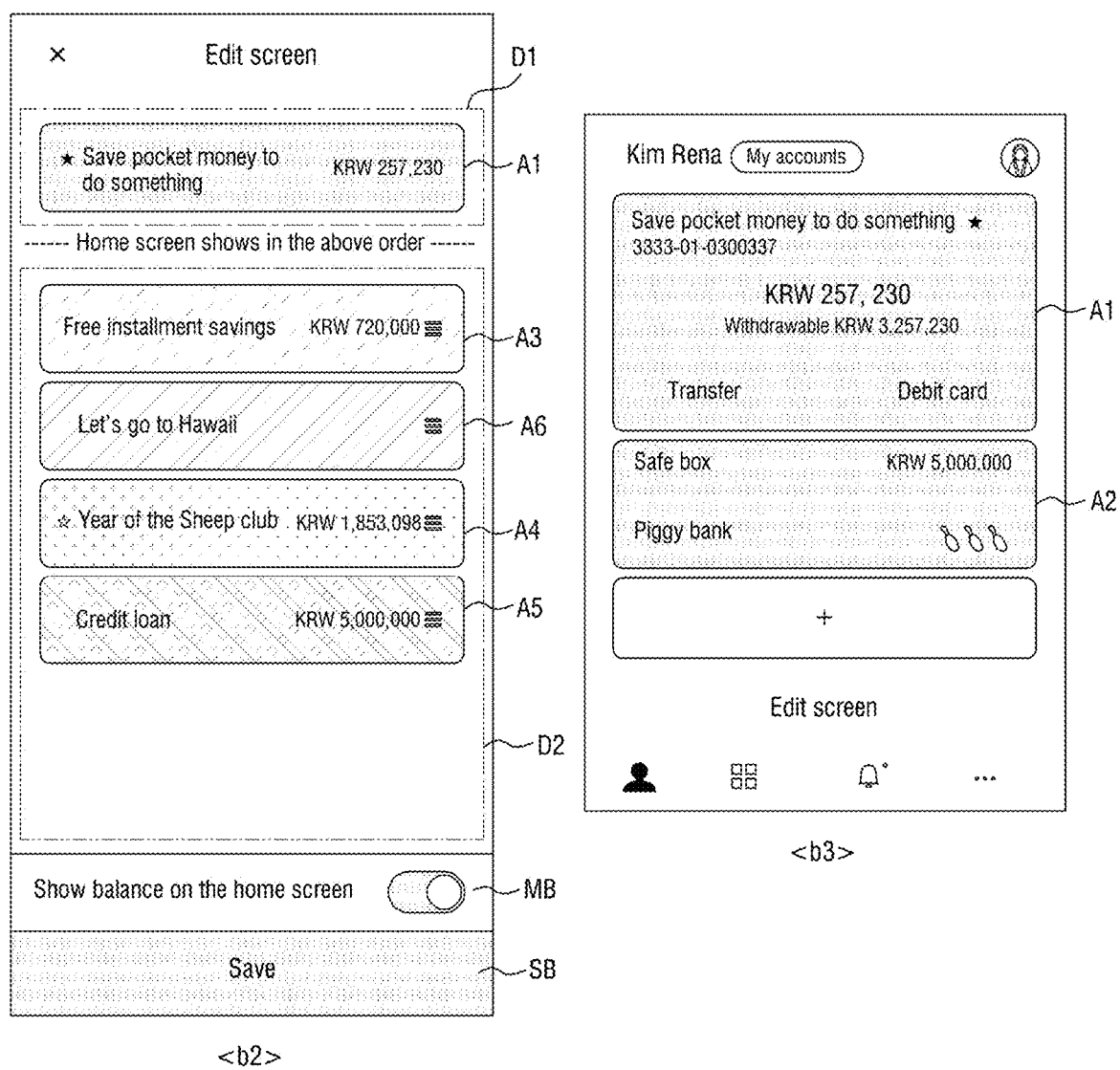

FIGS. 4, 5A and 5B are diagrams for illustrating a method of adjusting a user interface displayed on a user device using a masking layer, for example, so as to set for hiding accounts in accordance with some embodiments of the described technology.

First, referring to FIG. 4, the user device 200 displays a plurality of accounts on the home screen (S210). At this time, the size of the plurality of accounts displayed on the home screen may be formed to be larger than that of the plurality of accounts displayed on the edit screen.

Next, the user device 200 receives a screen edit request from the user (S220).

Next, the user device 200 displays the plurality of accounts displayed on the home screen on the first area of the edit screen (S230).

At this time, the arrangement order of the plurality of accounts displayed on the edit screen may be the same as the arrangement order of the plurality of accounts displayed on the home screen. Each of the plurality of accounts may include an order change icon.

Next, the user freely changes the location of the displayed accounts to the first area or the second area (S240). At this time, the accounts for which the order change icon has been selected may be moved to the first area or the second area through the drag-and-drop animation based on a user input.

Next, the user device 200 displays only the accounts included in the first area on the home screen (S250). At this time, the user device 200 may display the plurality of accounts on the home screen in the same arrangement order as the arrangement order of the plurality of accounts included in the first area.

In the following, a method of hiding accounts in accordance with an embodiment of the described technology will be described using the first area and the second area of the edit screen with reference to FIGS. 5A and 5B. In FIGS. 5A and 5B, <b1> and <b2> show illustrations for setting accounts to be hidden in the edit screen SD, and <b3> shows the home screen HD after the setting for hiding is completed.

Referring to FIGS. 1, 3A, 3B, 5A and 5B, in a method for providing a service of hiding account information in accordance with an embodiment of the described technology, the user may move accounts to be hidden among the plurality of accounts displayed on the first area D1 of the edit screen SD to the second area D2.

At this time, the user device 200 may provide a function for setting an arrangement order for a plurality of accounts and an action for moving accounts (e.g., raising after releasing in the middle) in the edit screen SD.

For example, the user may move the fifth account A5 to the second area D2 by selecting the order change icon HG on the edit screen SD. In addition, the user may move the fifth account A5, the sixth account A6, the fourth account A4, and the third account A3 to the second area D2. The user device 200 may display the fifth account A5, the sixth account A6, the fourth account A4, and the third account A3 in the second area D2.

At this time, the user device 200 may display the account name, balance information, account color, and order change icon HG onto the accounts located in the second area D2. In addition, the user may select the order change icon HG to move some accounts to the first area D1.

Next, if the user clicks the save button SB, the user device 200 may display the home screen HD. At this time, the user device 200 may display on the home screen HD only the first account A1 located in the first area D1 of the edit screen SD and the second account A2, which is a safe box that was excluded from editing.

Figure 6A:
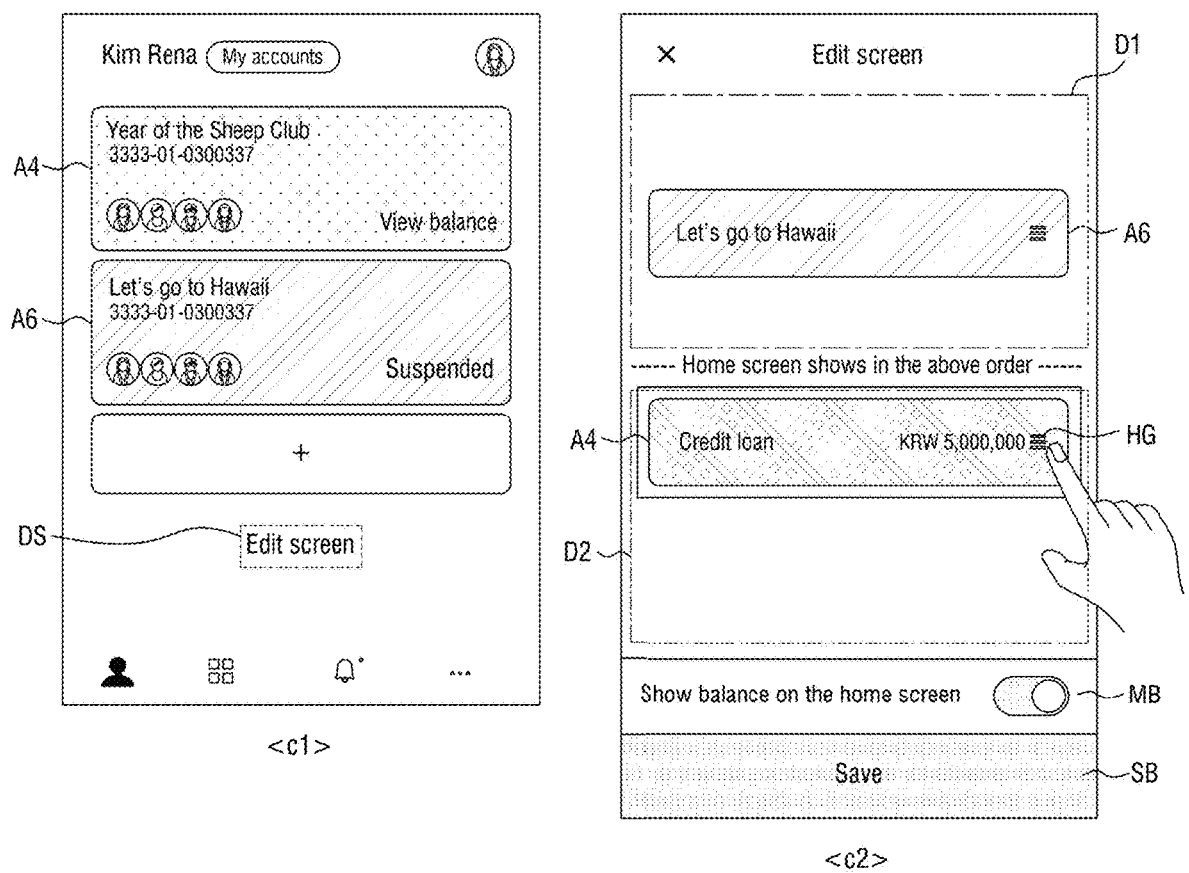
FIGS. 6A and 6B are diagrams for illustrating one embodiment of hiding all accounts in accordance with the method of setting for hiding accounts of FIG. 4.
Figure 6B:
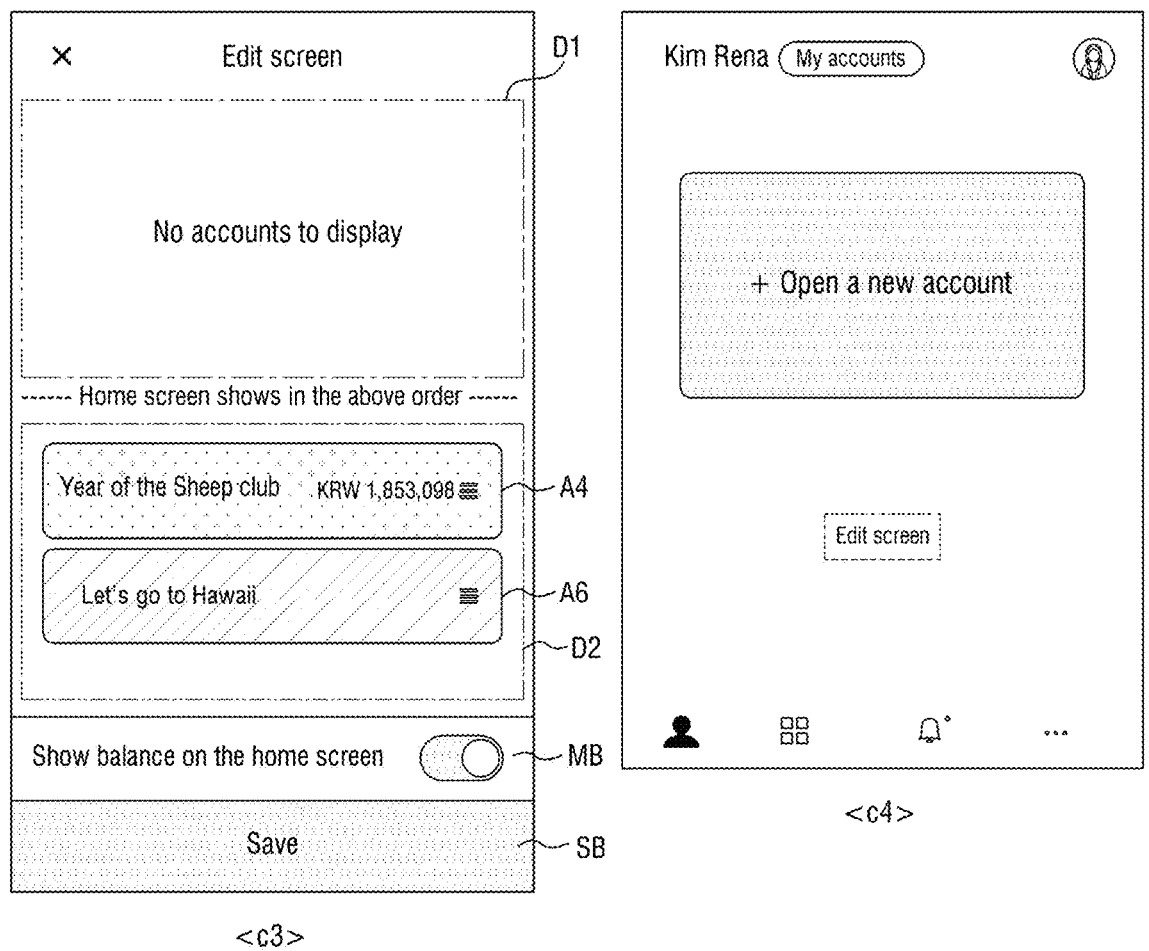

Meanwhile, FIGS. 6A and 6B are diagrams for illustrating one embodiment of hiding all accounts in accordance with the method of setting for hiding accounts of FIG. 4. In this case, it is assumed that the user does not have any account but meeting-member bankbooks.

In FIGS. 6A and 6B, <c1> shows the home screen HD of the user, <c2> and <c3> show an illustration for setting accounts to be hidden, and <c4> shows the home screen HD after setting accounts to be hidden.

Referring to FIGS. 1, 3A, 3B, 6A and 6B, if the user runs the application, the user device 200 may display on the home screen HD the fourth account A4, which is a first meeting-member bankbook account (e.g., 'Year of the Sheep Club'), and the sixth account A6, which is a second meeting-member bankbook account (e.g., 'Let's go to Hawaii').

Next, the user may click the screen edit button DS. After receiving a screen edit request from the user, the user device 200 may display the edit screen SD. At this time, the fourth account A4 and the sixth account A6 displayed on the home screen HD may be displayed on the first area D1 of the edit screen SD.

Next, the user device 200 may move the fourth account A4 and the sixth account A6 displayed on the first area D1 to the second area D2 based on a user input.

Next, the user device 200 may display the fourth account A4 and the sixth account A6 on the second area D2, and receive a save request from the user via the save button SB.

The user device 200 may receive the accounts included in the first area D1 and may not display the accounts on the home screen HD.

In other words, the user device 200 can provide a service of hiding to all of the members participating in meeting bankbooks, unreal-name customers, real-name customers, etc., in the case of having only own accounts without a primary account or in the case of having only meeting-member bankbooks without own accounts. However, this is just one example and the described technology is not limited thereto.

In short, the method for providing a service of hiding account information of the described technology can prevent accounts from being exposed to others and thus improve financial security for each person by displaying only the plurality of accounts set by the user on the home screen.

In the following, a method of hiding balance information in an account using the balance display button, performed in the method for providing a service of hiding account information, will be described.

Figure 8A:
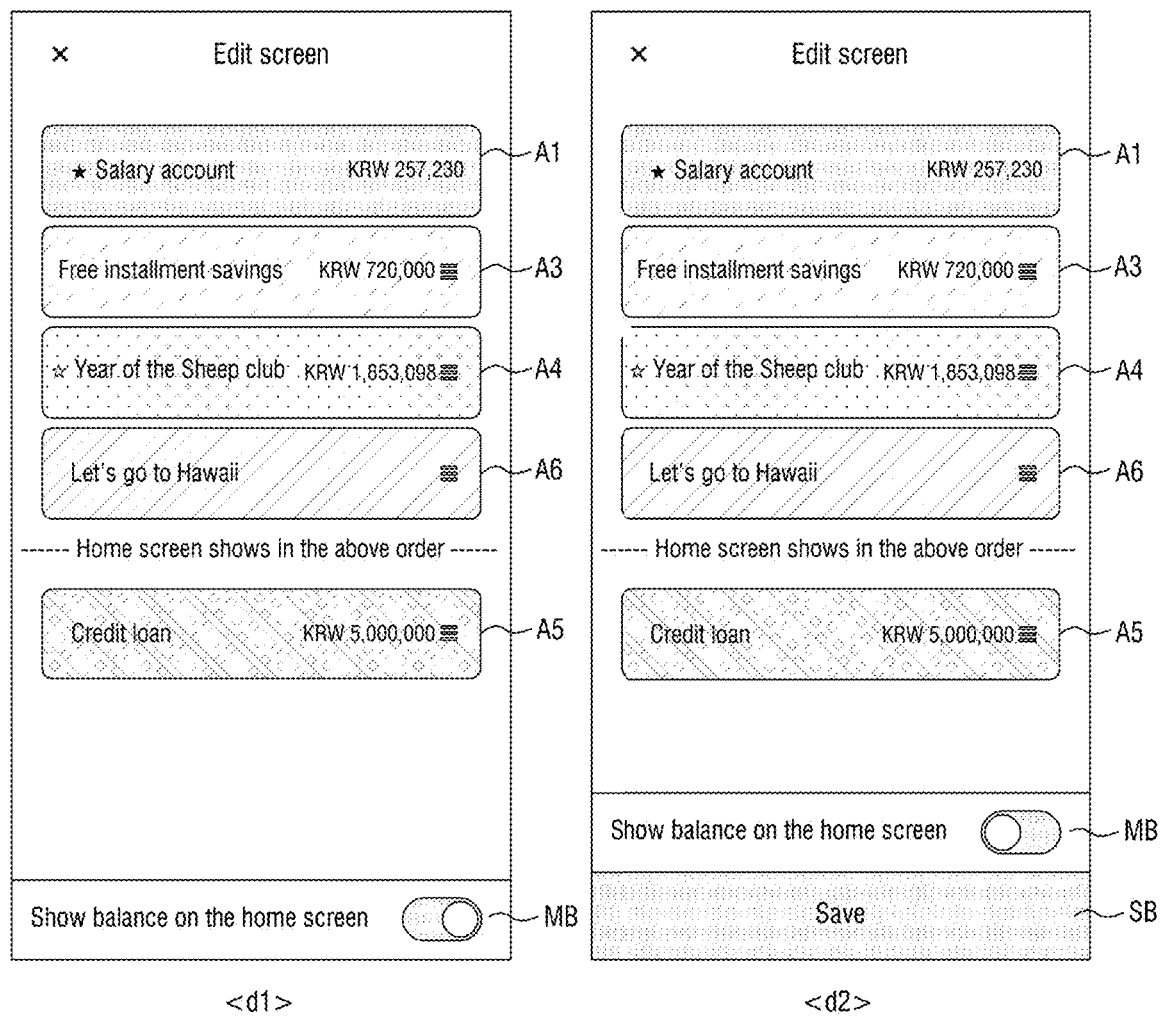
Figure 8B:
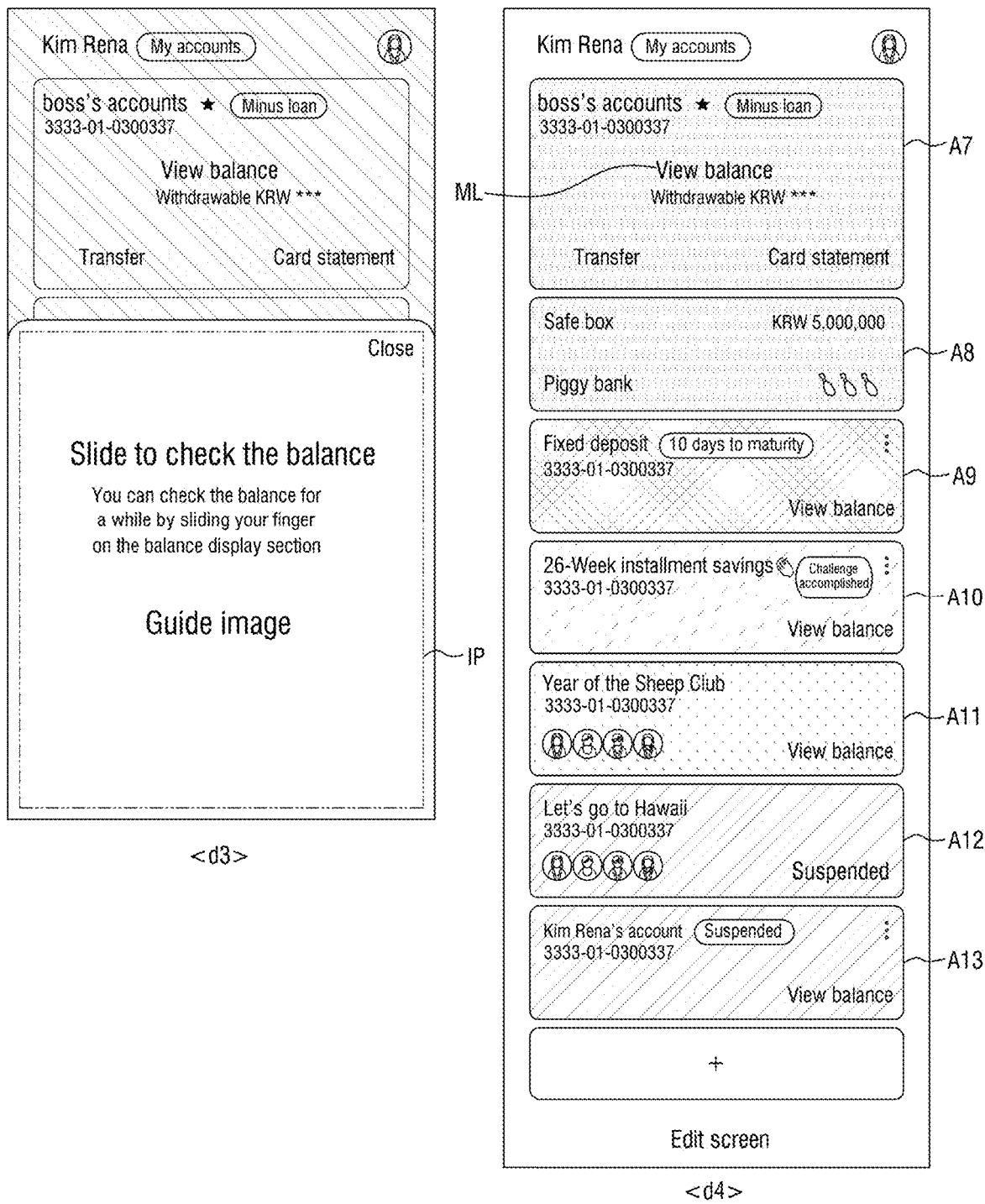

FIGS. 7, 8A and 8B are diagrams for illustrating a method of setting for hiding balance information of an account in accordance with some embodiments of the described technology.

First, referring to FIG. 7, the user device 200 displays accounts on the screen and receives a screen edit request from the user (S310 and S320).

Next, the user device 200 displays a balance display button in the edit screen (S330). At this time, the user device 200 may display an initial value of the balance display button as a balance display setting.

Next, the user device 200 receives a balance display cancellation command from the user (S340). The balance display cancellation command may be executed by sliding the balance display button and disabling a function of 'displaying the balance on the home screen.' The user device 200 may display the save button SB on the edit screen at the same time as receiving the change in the balance display setting.

At this time, the user device 200 may display a pop-up for a method of checking the balance.

Next, the user device 200 hides the balance information of the accounts displayed on the screen (S350). At this time, the user device 200 may display other information (e.g., 'view balance' text, a separate image, etc.) in the balance display area without disclosing the balance information.

Referring to FIGS. 8A and 8B, <d1> and <d2> are illustrations showing a balance display setting method of the edit screen SD, <d3> is an illustration showing a guide pop-up IP displayed after the balance display has been canceled, and <d4> is an illustration showing the home screen HD with the balance information hidden after the balance display has been canceled.

Specifically, the user device 200 may display the balance display button MB on the edit screen SD.

Next, the user device 200 may change the position of the balance display button MB of the edit screen SD to an OFF state based on the user input. Next, the user device 200 may cancel the balance display function by receiving an input at the save button SB for canceling the balance display.

At this time, the user device 200 may display the balance information of the accounts in the edit screen SD, regardless of setting or canceling the balance display function. However, this may be changed and implemented in other embodiments.

Next, if the user device 200 displays the home screen HD, the user device 200 may display the guide pop-up IP.

The guide pop-up IP may include a description, an image, etc. for the function of checking the balance and the method of checking the balance. If the user closes the guide pop-up IP, the user device 200 may not display the guide pop-up IP again until the balance display function is reset by the user.

However, the guide pop-up IP may be displayed each time the user enters the home screen HD after the balance display function is changed from setting to cancellation.

Next, if the user closes the guide pop-up IP, the user device 200 may display on the home screen HD a seventh account A7, an eighth account A8, a ninth account A9, a tenth account A10, an eleventh account A11, a twelfth account A12, and a thirteenth account A13, which are all the accounts displayed on the home screen HD, with the balance information thereof hidden.

Specifically, the user device 200 may hide the balance display by displaying a masking layer ML including the phrase 'view balance' instead of the balance information on the balance display area of the seventh account A7, the eighth account A8, the ninth account A9, the tenth account A10, the eleventh account A11, the twelfth account A12, and the thirteenth account A13. However, the described technology is not limited thereto, and other phrases, images, etc., may be used instead of 'view balance' on the masking layer ML.

In the following, a method of hiding balance information and a method of disclosing the balance information using a touch event for accounts of the described technology will be described in detail.

FIG. 9 is a flowchart for illustrating an algorithm of a method of adjusting a user interface displayed on a user device using a masking layer, for example, so as to hide and show balance information in accordance with one embodiment of the described technology.

Referring to FIG. 9, the user device 200 displays accounts on the screen (S410).

Next, the user device 200 displays a masking layer covering a balance display area of the accounts displayed (S420). At this time, the masking layer may be formed and displayed opaquely on the balance display area.

Next, the user device 200 determines whether a touch event of the user has occurred on the balance display area (S430).

Next, if a touch event has occurred, the user device 200 determines whether the length dragged through the touch event of the user is greater than a preset threshold (S440).

Specifically, the user device 200 may receive a touch start point where the touch event has first occurred and a touch end point where the touch event has last occurred. The user device 200 may calculate the dragged length based on the length between the touch start point and the touch end point.

If the dragged length is less than the threshold, the user device 200 scrolls the screen based on the touch event (S445). That is, an operation of scrolling the entire screen may be performed by transferring the inputted touch event of the user to the scroll operation.

On the other hand, if the dragged length is greater than the threshold, the user device 200 adjusts the size of the masking layer using the width between the touch start point and the touch end point (S450). At this time, the user device 200 may increase or decrease the size of the masking layer through a gradually changing animation effect. As the size of the masking layer is adjusted, the balance information located beneath the masking layer may be shown on the screen.

Next, the user device 200 determines whether the touch event has ended (S460).

If the touch event has not ended, the user device 200 performs steps S450 to S460 repetitively.

On the other hand, if the touch event has ended, the user device 200 readjusts the size of the masking layer (S470). At this time, the user device 200 may increase the size of the masking layer so that the size of the masking layer returns to an initial set value. In this case, the change in the size of the masking layer may be expressed through an animation effect that changes gradually as described above.

Figure 10:
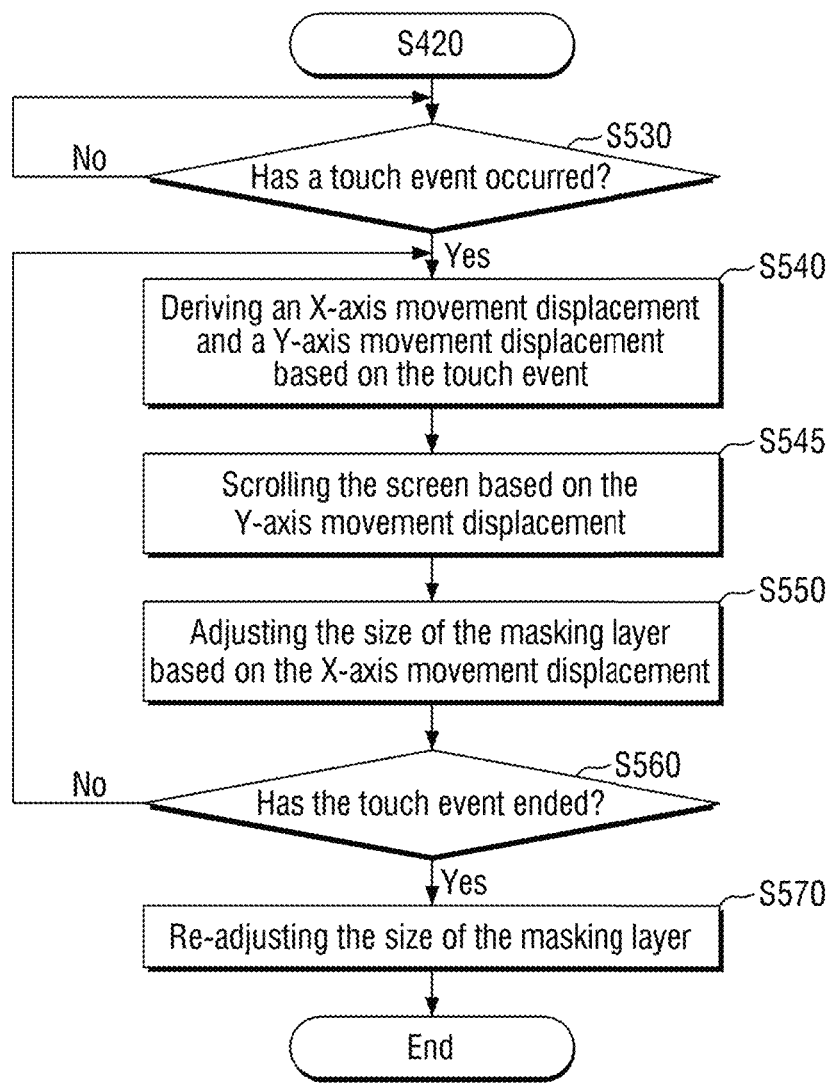
FIG. 10 is a flowchart for illustrating an algorithm of a method of adjusting a user interface displayed on a user device using a masking layer, for example, so as to hide and show balance information in accordance with another embodiment of the described technology.

FIG. 10 is a flowchart for illustrating an algorithm of a method of adjusting a user interface displayed on a user device using a masking layer, for example, so as to hide and show balance information in accordance with another embodiment of the described technology. In the following, the description overlapping with that described above with reference to FIG. 9 will not be repeated, and differences will be mainly described.

Referring to FIG. 10, following step S420 described above, the user device 200 determines whether a touch event of the user has occurred on the screen (S530).

Next, if a touch event has occurred, the server 100 derives a first axis movement displacement (in the following, referred to as an X-axis movement displacement) and a second axis movement displacement (in the following, referred to as a Y-axis movement displacement) of the touch event based on the touch event of the user (S540). At this time, the X-axis movement displacement and the Y-axis movement displacement may be set to extend in a direction orthogonal to each other.

For example, the X-axis movement displacement may be set in the horizontal axis direction (i.e., the left and right direction) of the screen, and the Y-axis movement displacement may be set in the vertical axis direction (i.e., the up and down direction) of the screen. At this time, the X-axis movement displacement may be a movement distance of the touch event in the horizontal axis direction, and the Y-axis movement displacement may be a movement distance of the touch event in the vertical axis direction.

However, this is just one example, and the extension directions of the X-axis movement displacement and the Y-axis movement displacement may be changed as the screen is tilted.

Next, the user device 200 scrolls the screen based on the Y-axis movement displacement derived (S545). That is, an operation of scrolling the screen in the Y-axis direction (e.g., the vertical direction of the screen) may be performed by transferring the derived Y-axis movement displacement to the scroll operation.

Next, the user device 200 adjusts the size of the masking layer based on the X-axis movement displacement (S550). As the size of the masking layer is adjusted, the balance information located beneath the masking layer may be shown on the screen. At this time, the user device 200 may increase or decrease the size of the masking layer through a gradually changing animation effect.

On the other hand, in a further embodiment, the user device 200 may be operated to derive the X-axis movement displacement only for a portion of the inputted touch event that overlaps with the balance display area and to adjust the size of the masking layer based on this.

In addition, although steps S545 and S550 are described as being sequentially performed in FIG. 10, the described technology is not limited thereto, and as a matter of course, steps S545 and S550 may be performed by changing the order or may be performed simultaneously. Accordingly, if the user generates a touch event dragging diagonally on the screen, the operation of displaying the balance information on the screen and the operation of scrolling the entire screen vertically may be performed simultaneously.

Next, the user device 200 determines whether the touch event of the user has ended (S560).

If the touch event has not ended, the server 100 performs steps S540 to S550 repetitively.

On the other hand, if the touch event has ended, the user device 200 readjusts the size of the masking layer (S570). At this time, the server 100 may increase the size of the masking layer so that the size of the masking layer returns to an initial set value. Likewise, the change in the size of the masking layer may be expressed through an animation effect that changes gradually.

Figure 11A:
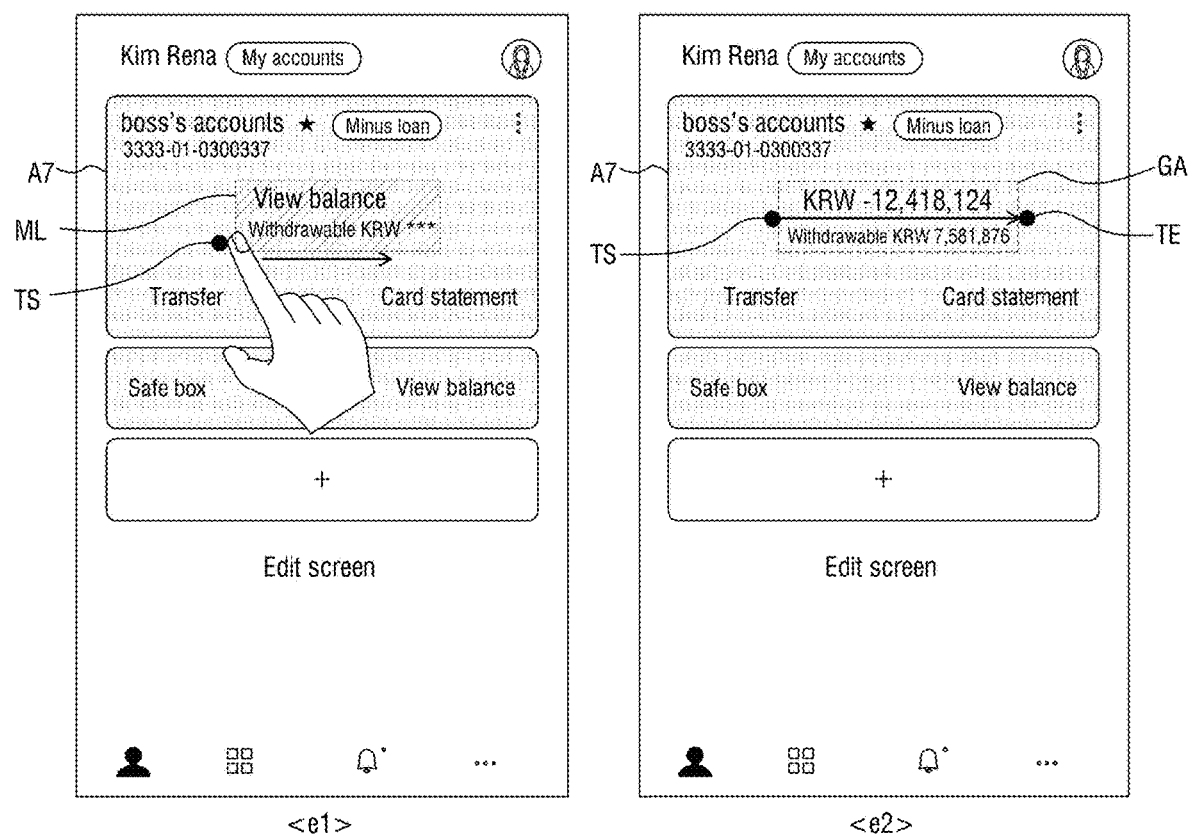
FIGS. 11A and 11B are diagrams for illustrating the method of hiding and disclosing balance information of FIG. 9.
Figure 11B:
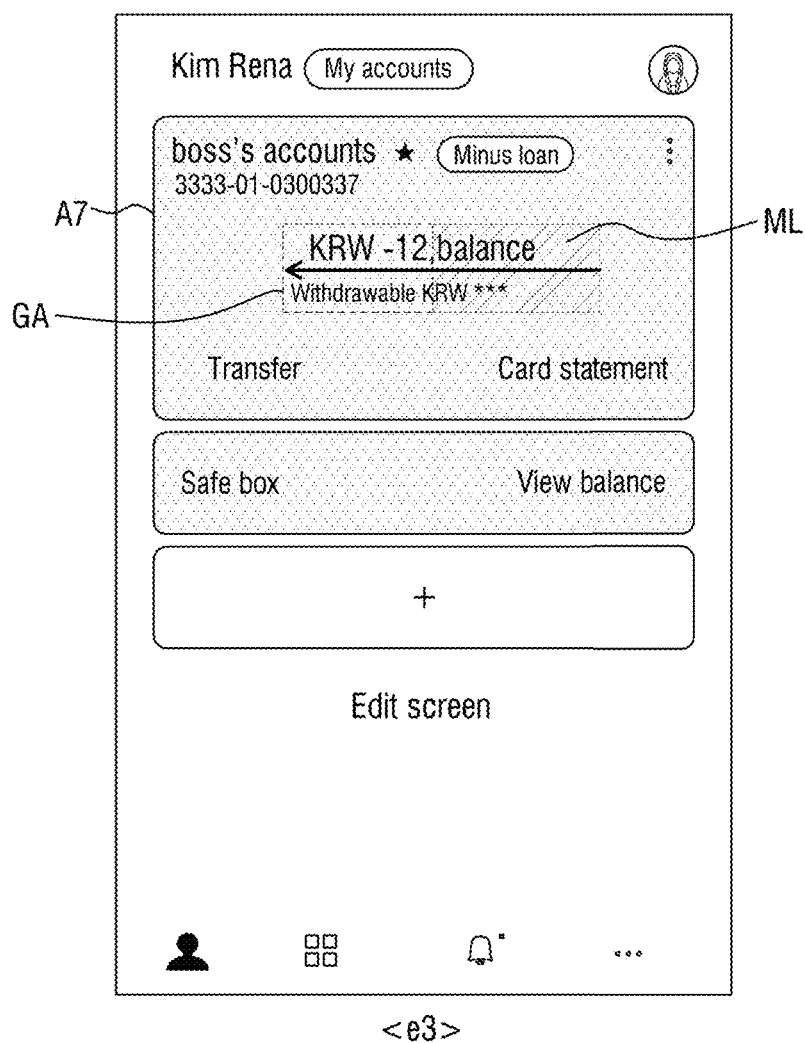

FIGS. 11A and 11B are diagrams for illustrating the method of hiding and disclosing balance information of FIG. 9. Here, a description will be given with an example in which the user device 200 uses a masking layer ML to hide the balance information of the seventh account A7.

In FIGS. 11A and 11B, <e1> is an illustration showing a method of disclosing hidden balance information using a touch event (e.g., a slide), <e2> is an illustration that the balance that was hidden is disclosed in the account by the touch event, and <e3> is an illustration showing that the balance information that has been disclosed is hidden again after the touch event has ended.

In the following, it is assumed that the maximum values of the widths of the masking layer ML and the balance layer (GL in FIG. 13) are equal to the width of the balance display area GA for convenience of description.

Referring to FIGS. 1, 3A, 3B, 11A and 11B, the user device 200 may display an opaque masking layer ML on the balance display area GA of the seventh account A7 for which the balance display function has been canceled.

At this time, the user device 200 may display preset contents (e.g., 'view balance') on the masking layer ML.

Further, the user device 200 may set the width of the masking layer ML to the maximum value of a preset range.

Next, the user device 200 may receive a touch event that has occurred in the balance display area GA from the user. The user device 200 may receive a touch start point TS and a touch end point TE through the touch event.

Next, the user device 200 may calculate a length between the touch start point TS and the touch end point TE based on the received touch start point TS and the touch end point TE. At this time, a threshold may be set to a predetermined number of pixels or a predetermined distance.

Next, if the distance between the touch start point TS and the touch end point TE (i.e., the dragged length) does not exceed the threshold, the user device 200 may transfer the touch event to a scroll operation on the screen. For example, the user device 200 may perform operations such as scrolling the account list according to the vertical scrolling, etc., based on the touch event.

On the other hand, if the dragged length exceeds the preset threshold, the user device 200 may start the balance display function.

Specifically, the user device 200 may decrease the width of the masking layer ML based on the calculated width. If the width of the masking layer ML has decreased, the user device 200 may display the balance information (or the net cash balance) of the seventh account A7 on the balance display area GA corresponding to the location where the masking layer ML has been disappeared. At this time, if both the net cash balance and the withdrawable balance are present in the account, the user device 200 may display both the net cash balance and the withdrawable balance in the balance display area GA.

For example, if the user slides the balance display area GA completely from left to right, the user device 200 may receive the touch start point TS at the left end of the balance display area GA, and receive the touch end point TE at the right end.

Next, the user device 200 may calculate the width between the touch start point TS and the touch end point TE. At this time, the calculated width may be the entire width of the balance display area GA.

The user device 200 may set the width of the masking layer ML to a value obtained by subtracting the calculated width from the maximum value that is the initially set width of the masking layer ML. As the dragged length of the touch event increases, the width of the masking layer ML may decrease.

When the width of the masking layer ML is changed to the minimum value by the touch event, the user device 200 may disclose the balance information (e.g., KRW −12,418,124) of the account on the balance display area GA.

Next, when the touch event has ended, the user device 200 may increase the width of the masking layer ML up to the initial value (i.e., the maximum value). Similarly, the user device 200 may change the width of the masking layer ML up to the maximum value by using an animation effect in which the size of the masking layer ML is gradually increased.

At this time, the masking layer ML may be changed at the same time as the touch event ends, or may be changed after a predetermined time has elapsed. Here, the predetermined time may be changed by the setting of a user or a system operator.

In the following, an example of implementing a method of hiding balance information displayed in an account and a method of disclosing the balance information through a touch event will be described.

Figure 12:
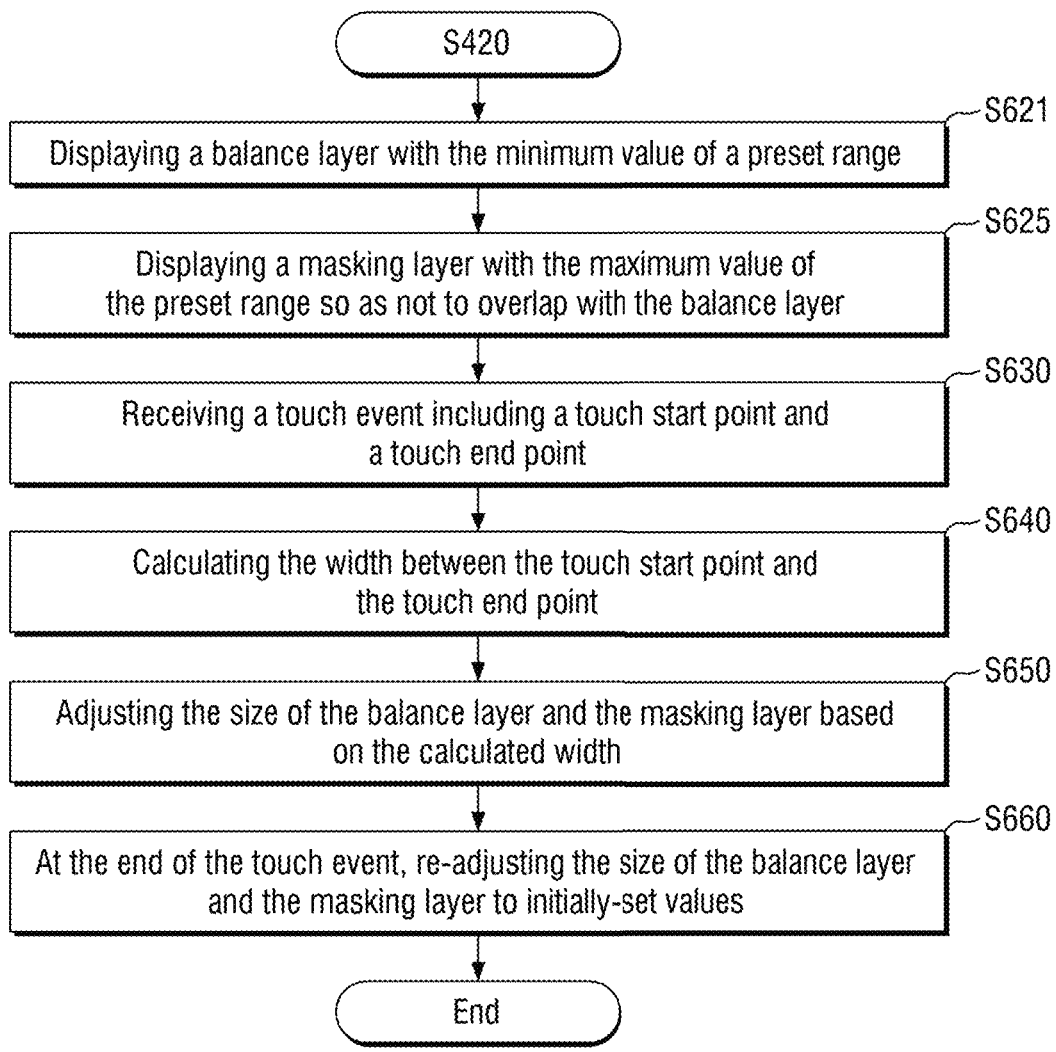
FIGS. 12, 13A and 13B are diagrams for illustrating a method of adjusting a user interface displayed on a user device using a masking layer, for example, so as to hide and show balance information in accordance with one embodiment of the described technology.
Figure 13A:
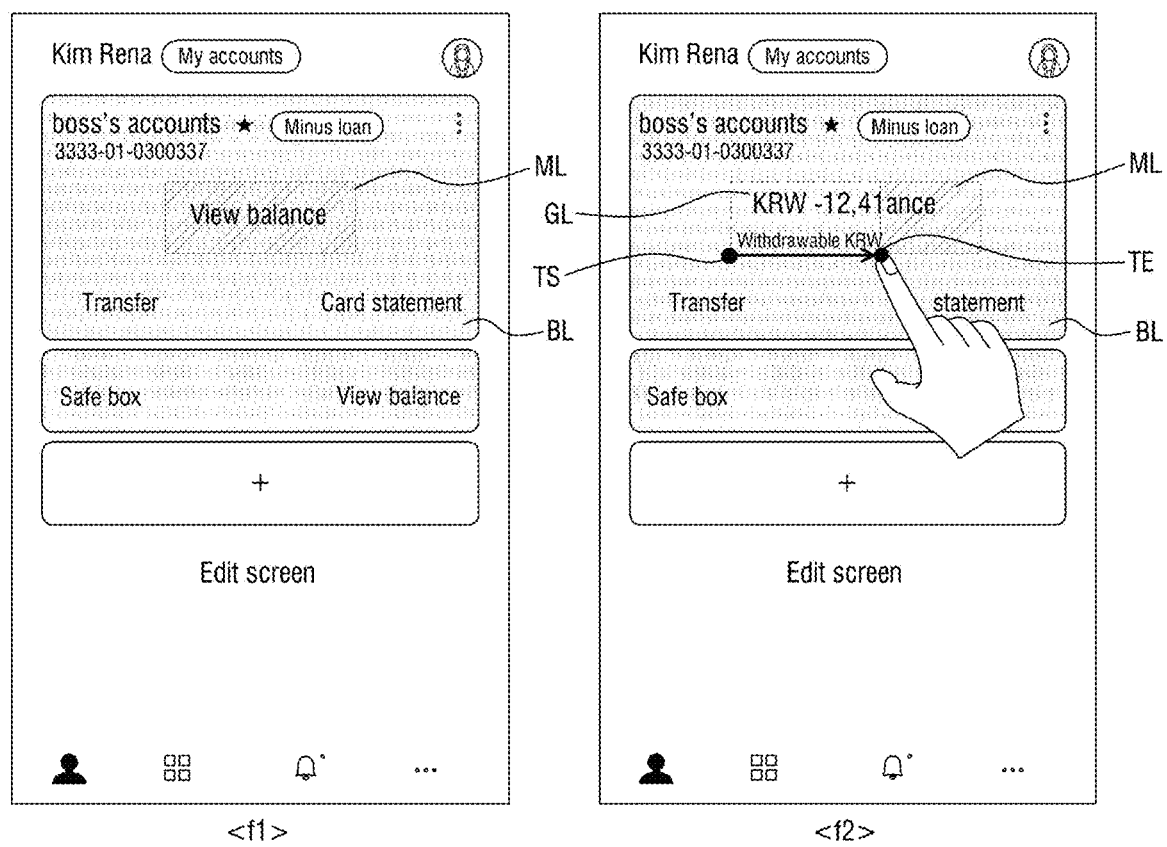
Figure 13B:
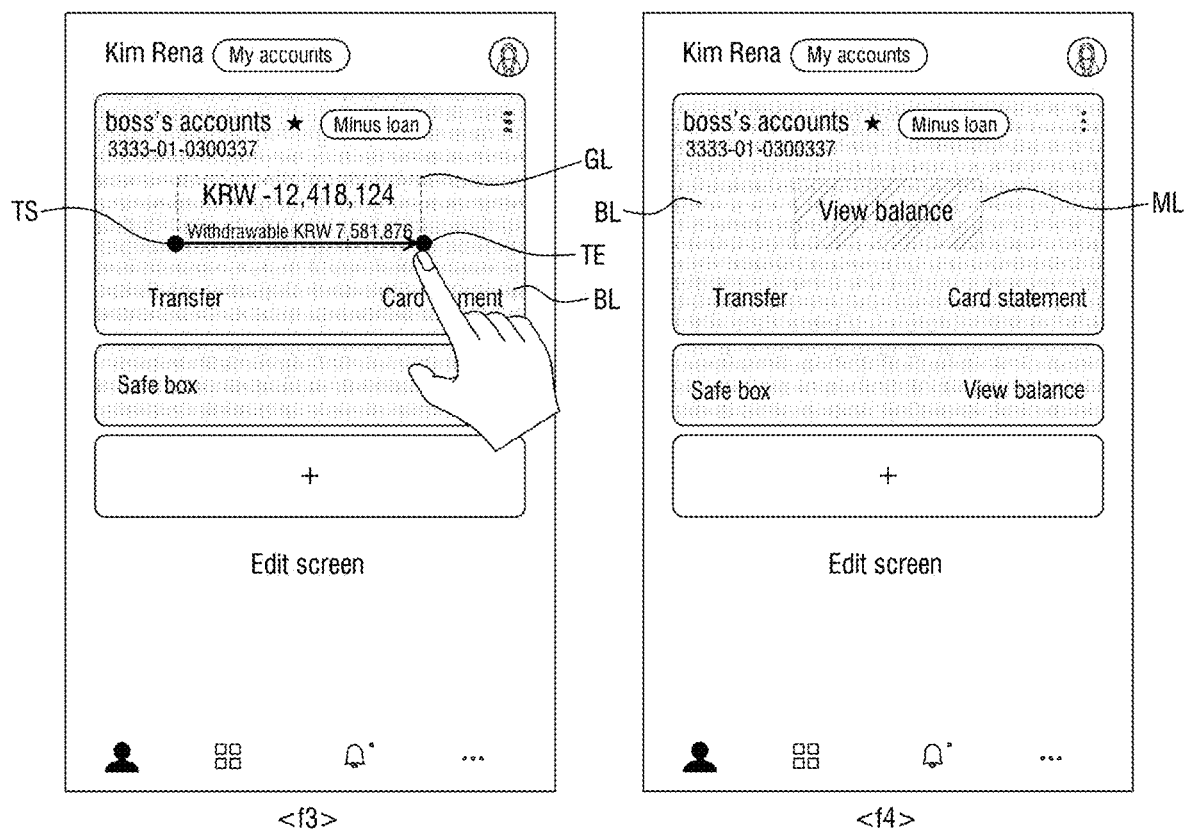

FIGS. 12, 13A and 13B are diagrams for illustrating a method of adjusting a user interface displayed on a user device using a masking layer, for example, so as to hide and show balance information in accordance with one embodiment of the described technology. Here, <f1> is an illustration showing that the balance in an account is hidden by a masking layer ML, <f2> and <f3> are illustrations showing that the hidden balance is disclosed by a touch event, and <f4> is an illustration showing that the balance is hidden after the touch event has ended.

First, the user device 200 may display on an account displayed on the screen a background layer BL corresponding to that account. In addition, the user device 200 may display the balance layer GL and the masking layer ML upon the background layer BL.

In this case, although not clearly illustrated in the drawings, the balance layer GL may be arranged beneath the masking layer ML.

As set initial values, the width of the balance layer GL may be displayed with the minimum value of a preset range, and the width of the masking layer ML may be displayed with the maximum value of a preset range. At this time, the balance layer GL and the masking layer ML displayed on the screen may be expressed so as not to overlap with each other.

Next, the widths of the balance layer GL and the masking layer ML may vary based on the touch event. At this time, the width of the balance layer GL and the width of the masking layer ML may be changed in inverse proportion to each other.

Specifically referring to FIG. 12, following step S420 of FIG. 9, the user device 200 displays the balance layer with the minimum value of a preset range (S621). At this time, the user device 200 may display the balance layer GL on the balance display area of the background layer BL corresponding to a particular account.

Next, the user device 200 displays the masking layer ML with the maximum value of a preset range so as not to overlap with the balance layer GL (S625).

At this time, the masking layer ML may be displayed on the balance display area of the background layer BL.

Next, the user device 200 receives a touch event including a touch start point and a touch end point (S630).

Next, the user device 200 calculates the width between the touch start point and the touch end point (S640).

Next, the user device 200 adjusts the size of the balance layer GL and the masking layer ML based on the calculated width (S650).

At this time, the user device 200 may increase the size of the balance layer GL based on the calculated width. Whereas the user device 200 may decrease the size of the masking layer ML based on the calculated width.

Next, the user device 200 readjusts the size of the balance layer GL and the masking layer ML to the initial set values at the end of the touch event (S660). That is, the user device 200 may decrease the width of the balance layer GL down to the minimum value and increase the size of the masking layer ML up to the maximum value, thereby hiding the balance information.

Specifically, for example, referring to <f1> and <f2> of FIG. 13A, if a touch event occurs, the user device 200 may disclose the balance information by adjusting the widths of the balance layer GL and the masking layer ML.

When the user starts touching, the user device 200 may extract a touch start point TS and a touch end point TE from the touch event.

Next, the user device 200 may calculate the width between the touch start point TS and the touch end point TE.

Next, the user device 200 may adjust the size of the balance layer GL and the masking layer ML based on the calculated width.

At this time, the user device 200 may change the width of the masking layer ML to a value obtained by subtracting the calculated width from the maximum value of the width of the masking layer ML. Next, the user device 200 may display the masking layer ML whose width is decreasing upon the background layer BL. At this time, only part of the 'view balance' text may be displayed on the contents of the masking layer ML.

On the other hand, the user device 200 may change the width of the balance layer GL to a value obtained by adding the calculated width to the minimum value of the width of the balance layer GL. In this case, the user device 200 may display the balance layer GL whose width is increasing upon the background layer BL.

Through this, the user device 200 may expose part of the balance layer GL between the touch start point TS and the touch end point TE, thereby showing a portion of the balance of the account.

In <f3> of FIG. 13B, the calculated width between the touch start point TS and the touch end point TE may be the maximum value of the preset range.

Therefore, the user device 200 may display the masking layer ML with the minimum value of the preset range upon the background layer BL. On the other hand, as the width of the balance layer GL is displayed with the maximum value, the user device 200 displays the full balance information (e.g., KRW −12,418,124) in the account.

Next, referring to <f4> of FIG. 13B, the user device 200 may receive the end of the touch event. That is, an input that the user ends the touch operation of dragging and releases his or her hand may be received.

When the touch input of the user has ended, the user device 200 may change the width of the balance layer GL to be the minimum value of the preset range. On the contrary, the user device 200 may change the width of the masking layer ML to be the maximum value of the preset range. Through this, an animation effect of hiding the disclosed balance information again may be expressed on the screen.

In the following, another implementation of the method of hiding the balance information and disclosing the balance information will be described.

Figure 14:
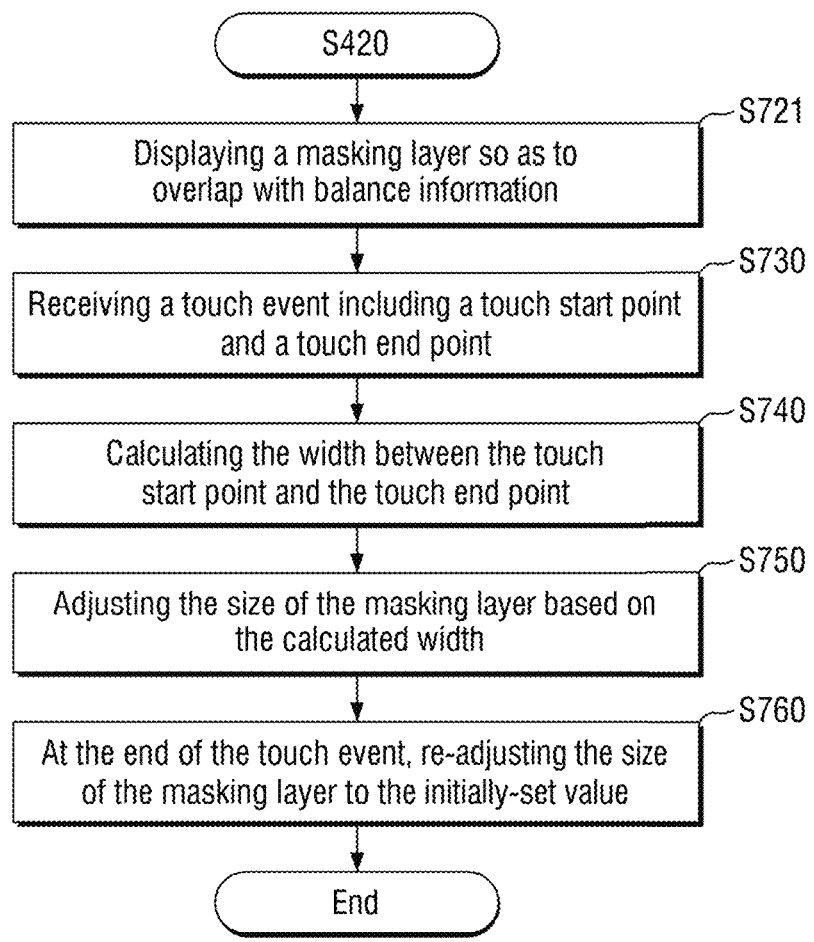
FIGS. 14, 15A and 15B are diagrams for illustrating a method of adjusting a user interface displayed on a user device using a masking layer, for example, so as to hide and show balance information in accordance with another embodiment of the described technology.
Figure 15A:
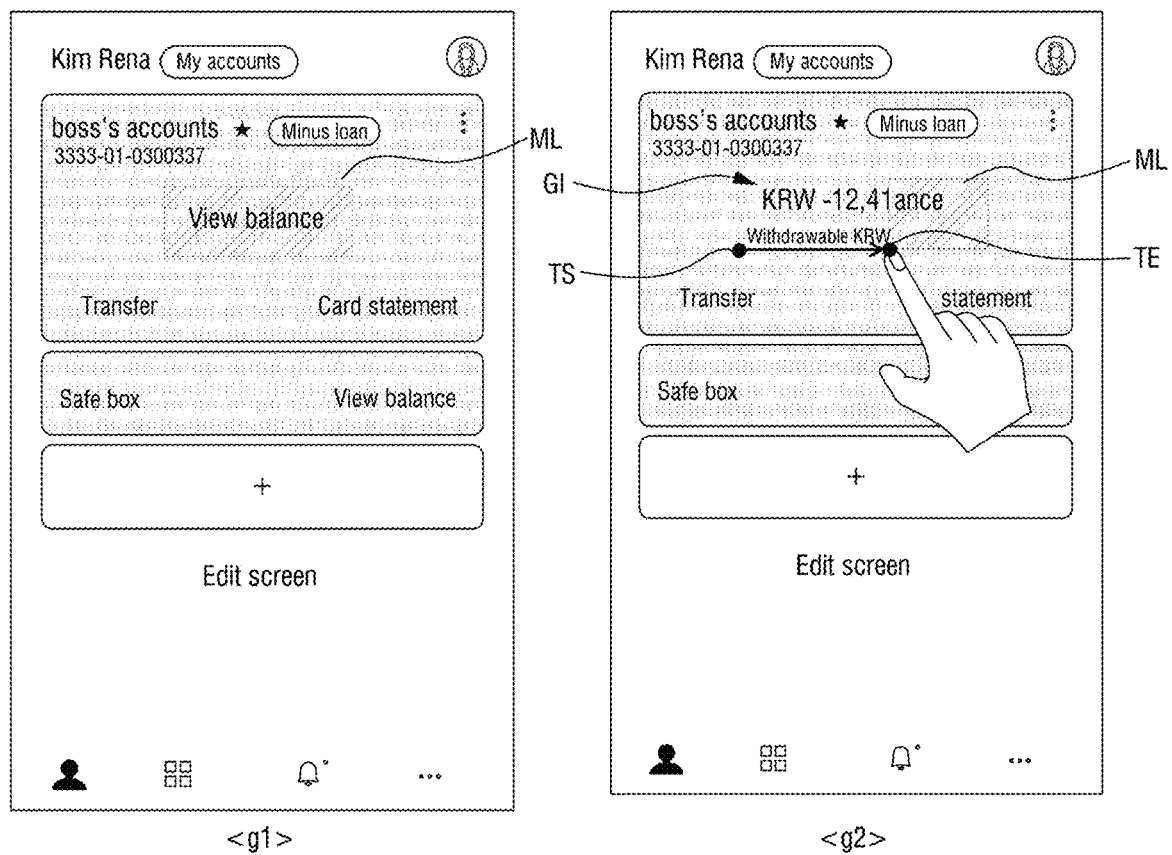
Figure 15B:
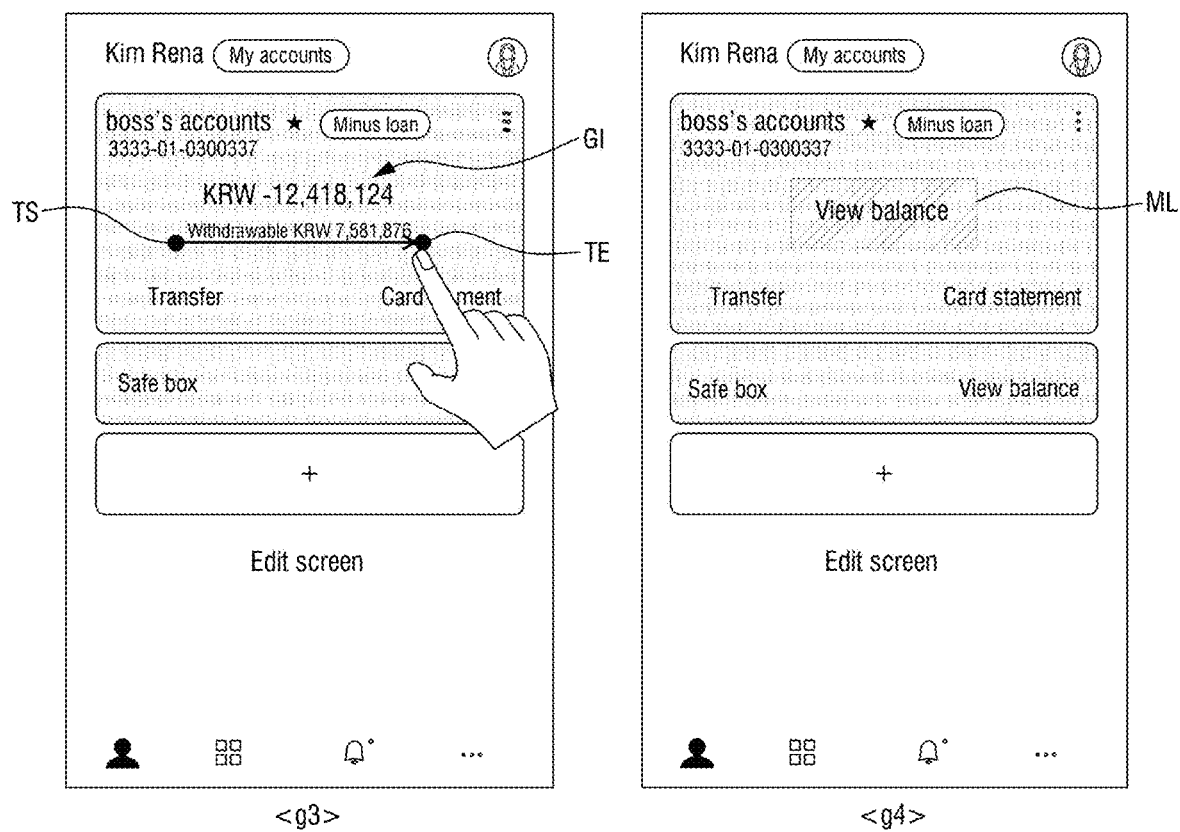

FIGS. 14, 15A and 15B are diagrams for illustrating a method of adjusting a user interface displayed on a user device using a masking layer, for example, so as to hide and show balance information in accordance with another embodiment of the described technology. Here, <g1> is an illustration showing that the balance of an account is hidden by masking, <g2> and <g3> are illustrations showing that the hidden balance is disclosed by a touch event, and <g4> is an illustration showing that the balance is hidden after the touch event has ended. In the following, the description of the part overlapping with that described above will be brief or will not be repeated, and the differences will be mainly described.

Referring to FIGS. 14, 15A and 15B, following step S420 of FIG. 9, the user device 200 displays a background layer BL including the balance information of a particular account for that account, and displays a masking layer ML that covers the balance information upon the background layer BL (S721).

At this time, the balance information may be displayed in the balance display area of the background layer BL, and the masking layer ML may be displayed to overlap with the balance information in the balance display area.

Next, the user device 200 receives a touch event including a touch start point and a touch end point (S730).

Next, the user device 200 calculates the width between the touch start point and the touch end point (S740).

Next, the user device 200 adjusts the size of the masking layer ML based on the calculated width (S750). At this time, the user device 200 may change the width of the masking layer ML to a value equal to a value obtained by subtracting the calculated width from the maximum value of a preset range.

Next, at the end of the touch event, the user device 200 readjusts the size of the masking layer ML to a preset initial set value (i.e., the maximum value of the preset range) (S760). At this time, the change in the size of the masking layer ML may be expressed through an animation effect that changes gradually.

Specifically, referring to <g1> of FIG. 15A, if a request for hiding balance is received from a user (that is, if the balance display button MB in FIG. 8 is disabled), the user device 200 may generate and display a masking layer ML on the balance display area.

At this time, the user device 200 may set the width of the masking layer ML to the maximum value of a preset range. The masking layer ML set to the maximum width may be arranged to overlap over the balance information in the balance display area.

Next, referring to <g2> of FIG. 15A, the user device 200 may disclose the hidden balance information based on a touch event of the user.

When the user starts touching, the user device 200 may receive a touch start point TS and a touch end point TE from the touch event.

Next, the user device 200 may calculate the width (i.e., the dragged length) between the touch start point TS and the touch end point TE. The user device 200 may change the width of the masking layer ML to a value obtained by subtracting the calculated width from the maximum value of the preset range. That is, the width of the masking layer ML may decrease by the increase of the dragged length.

At this time, as the width of the masking layer ML decreases by the increase of the dragged length, the user device 200 may disclose part of the balance information in the portion by which the width of the masking layer ML has been decreased in the balance display area.

Next, referring to <g3> of FIG. 15B, as the dragged length increases, the width of the masking layer ML may be displayed with the minimum value (e.g., 0) of the preset range. Accordingly, the balance information included in the balance display area may be disclosed completely.

Next, referring to <g4> of FIG. 15B, the user device 200 may receive the end of the touch event. That is, an input that the user ends the touch operation of dragging and releases his or her hand may be received.

When the touch event has ended, the user device 200 may increase the width of the masking layer ML up to the maximum value of the preset range. Through this, an animation effect of hiding the disclosed balance information again may be expressed on the screen.

The change in the size of the masking layer ML may occur as soon as the touch event ends. However, the described technology is not limited thereto, and the change in the size of the masking layer ML may occur after a preset time has elapsed after the end of the touch event. In this case, the preset time and the rate of change in the size of the masking layer ML may be freely changed.

Through this, the described technology discloses the balance information by adjusting the size of the masking layer ML based on the touch event of the user that has occurred in the balance display area. Through this, the user can check the balance of particular accounts only at the moments s/he desires, thereby reducing anxiety about exposure of financial information. Moreover, the described technology includes an entertainment element for checking balance information little by little as if scratching a lottery ticket, so that users can feel fun and increase the utilization rate of the service.

The above description is merely an illustrative description of the technical idea of the present embodiments, and those having ordinary skill in the art to which the present embodiments pertain will be able to make various modifications and variations without departing from the essential characteristics of the embodiments. Therefore, the present embodiments are not intended to limit the technical idea of the present embodiments but to describe it, and the scope of the technical idea of the present embodiments is not limited by these embodiments. The scope of protection of the present embodiments should be construed by the accompanying claims, and all technical ideas within the scope equivalent thereto should be construed as being included in the scope of the present embodiments.

What is claimed is:

1. A method of adjusting a user interface displayed on a user device, the method comprising:
   establishing, by a communication interface of the user device, a communication link with a server;
   receiving, by the communication interface, account information associated with a user from the server, the account information comprising one or more accounts of the user, each of the one or more accounts comprising at least a balance and an account number;
   providing, by a processor of the user device, a user interface on a display screen of the user device, the user interface configured to provide information associated with the one or more accounts, the user interface comprising a balance display area configured to display the balance of a selected account of the one or more accounts;
   controlling the user interface, by the processor, to display on the display screen a masking layer configured to cover the balance display area;
   determining, by the processor, whether a touch event dragged in one direction occurs on the balance display area, the touch event comprising a touch start point where dragging starts and a touch end point where the dragging ends;
   in response to determining that the touch event occurs on the balance display area, controlling the user interface, by the processor, to adjust a size of the masking layer based on a length between the touch start point and the touch end point of the touch event;
   determining, by the processor, whether the touch event ends; and
   in response to determining that the touch event ends, controlling the user interface, by the processor, to readjust the size of the masking layer to cover the balance display area such that the balance of the selected account is invisible on the display screen,
   wherein controlling the user interface to display the masking layer comprises:
   setting a width of the masking layer to a maximum value in response to determining that the touch event does not occur;
   decreasing the width of the masking layer in response to determining that the touch event occurs; and increasing the width of the masking layer up to the maximum value in response to determining that the touch event ends.

2. The method of claim 1, wherein the user interface further comprises:
a background layer corresponding to the selected account; and
a balance layer displayed on the background layer, being variable in size based on the touch event, and including balance information of the selected account,
wherein the masking layer is disposed on the background layer and variable in size to be in inverse proportion to a change in size of the balance layer.

3. The method of claim 2, further comprising:
setting a width of the balance layer to a minimum value and setting a width of the masking layer to a maximum value in response to determining that the touch event does not occur;
increasing the width of the balance layer and decreasing the width of the masking layer in response to determining that the touch event occurs; and
decreasing the width of the balance layer and increasing the width of the masking layer in response to determining that the touch event ends.

4. The method of claim 3, wherein:
the width of the balance layer is set to a value obtained by adding a width between the touch start point and the touch end point to the minimum value; and
the width of the masking layer is set to a value obtained by subtracting the width between the touch start point and the touch end point from the maximum value.

5. The method of claim 1, further comprising:
arranging the masking layer to overlap with balance information corresponding to the selected account; and
making the masking layer opaque to cover the balance information.

6. The method of claim 1, wherein the width of the masking layer is set to a value obtained by subtracting the width between the touch start point and the touch end point from the maximum value.

7. The method of claim 1, further comprising: in response to determining that the touch event ends, changing a width of the masking layer after a predetermined time has elapsed or changing at the same time as the touch event ends.

8. The method of claim 1, wherein controlling the user interface to adjust the size of the masking layer comprises:
determining whether a dragged length of the touch event exceeds a preset threshold; and
performing an operation of scrolling the screen based on the touch event in response to determining that the dragged length of the touch event does not exceed the threshold.

9. The method of claim 1, wherein controlling the user interface to adjust the size of the masking layer comprises:
deriving a first axis movement displacement and a second axis movement displacement intersecting the first axis movement displacement based on the touch event;
adjusting the size of the masking layer based on the first axis movement displacement; and
scrolling the screen using the second axis movement displacement.

10. The method of claim 1, wherein the touch start point is located to the left of the touch end point.

11. The method of claim 1, wherein controlling the user interface to adjust the size of the masking layer comprises gradually changing the size of the masking layer to provide an animation effect.

12. A non-transitory computer-readable recording medium storing computer-executable instructions, the computer-executable instructions configured to cause a computing device having at least one processor and at least one memory to perform a method of adjusting a user interface displayed on a user device, the method comprising:
establishing, by a communication interface of the user device, a communication link with a server;
receiving, by the communication interface, account information associated with a user from the server, the account information comprising one or more accounts of the user, each of the one or more accounts comprising at least a balance and an account number;
providing, by a processor of the user device, a user interface on a display screen of the user device, the user interface configured to provide information associated with the one or more accounts, the user interface comprising a balance display area configured to display the balance of a selected account of the one or more accounts;
controlling the user interface, by the processor, to display on the display screen a masking layer configured to cover the balance display area;
determining, by the processor, whether a touch event dragged in one direction occurs on the balance display area, the touch event comprising a touch start point where dragging starts and a touch end point where the dragging ends;
in response to determining that the touch event occurs on the balance display area, controlling the user interface, by the processor, to adjust a size of the masking layer based on a length between the touch start point and the touch end point of the touch event;
determining, by the processor, whether the touch event ends; and
in response to determining that the touch event ends, controlling the user interface, by the processor, to readjust the size of the masking layer to cover the balance display area such that the balance of the selected account is invisible on the display screen,
wherein controlling the user interface to display the masking layer comprises:
setting a width of the masking layer to a maximum value in response to determining that the touch event does not occur;
decreasing the width of the masking layer in response to determining that the touch event occurs; and
increasing the width of the masking layer up to the maximum value in response to determining that the touch event ends.

* * * * *